US012768239B2

(12) United States Patent
Shpak et al.

(10) Patent No.: US 12,768,239 B2
(45) Date of Patent: Oct. 20, 2026

(54) ROTATING CONTROL DEVICE

(71) Applicant: Opla Energy Ltd., Calgary (CA)

(72) Inventors: Vitaliy Shpak, Calgary (CA); Hossein Khorshidian, Calgary (CA)

(73) Assignee: Citadel Drilling Ltd., Calgary (CA)

( * ) Notice: Subject to any disclaimer, the term of this patent is extended or adjusted under 35 U.S.C. 154(b) by 193 days.

(21) Appl. No.: 18/199,315

(22) Filed: May 18, 2023

(65) Prior Publication Data

US 2023/0287754 A1 Sep. 14, 2023

Related U.S. Application Data

(63) Continuation of application No. PCT/CA2021/051627, filed on Nov. 17, 2021.

(60) Provisional application No. 63/115,720, filed on Nov. 19, 2020.

(51) Int. Cl.

| | |
|---|---|
| ***E21B 33/08*** | (2006.01) |
| ***E21B 33/068*** | (2006.01) |
| ***F16C 33/76*** | (2006.01) |

(52) U.S. Cl.

CPC .......... *E21B 33/085* (2013.01); *E21B 33/068* (2013.01); *F16C 33/76* (2013.01)

(58) Field of Classification Search

CPC ....... E21B 33/085; E21B 33/068; F16C 33/76

USPC ........................................................ 166/84.1

See application file for complete search history.

(56) References Cited

U.S. PATENT DOCUMENTS

| | | | | |
|---|---|---|---|---|
| 1,889,787 A | | 12/1932 | Minor | |
| 4,754,820 A | * | 7/1988 | Watts .................... | E21B 33/085 285/912 |
| 4,971,148 A | * | 11/1990 | Roche ..................... | E21B 33/06 166/88.1 |
| 5,396,952 A | * | 3/1995 | Stogner ..................... | E21B 3/02 166/78.1 |

(Continued)

FOREIGN PATENT DOCUMENTS

| | | |
|---|---|---|
| EP | 0956426 B1 | 10/2002 |
| EP | 2622173 B1 | 7/2018 |

OTHER PUBLICATIONS

International Search Report dated Feb. 23, 2022 in corresponding International Application No. PCT/CA2021/051627 filed Nov. 17, 2021; total 5 pages.

(Continued)

*Primary Examiner* — Tara Schimpf
*Assistant Examiner* — Patrick F Lambe
(74) *Attorney, Agent, or Firm* — Snell & Wilmer LLP

(57) ABSTRACT

A rotating control device wherein the bearing assembly can be secured to the bowl by rotationally coupling the bearing assembly with the bowl. When the bearing assembly is rotated in a first direction about a longitudinal axis relative to the bowl, an interlocking interface is formed between the inner surface of the bowl and the outer surface of the bearing assembly. The interlocking interface can be released by rotating the bearing assembly in a second direction relative to the bowl. The bowl comprises a rotary guide for engaging and rotating the bearing assembly. The rotary guide and the bearing assembly have an alignment profile for facilitating alignment of the bearing assembly with the bowl. The bearing assembly has a sealing element with axially extending fingers to provide internal structural support for the seal.

18 Claims, 13 Drawing Sheets

(56) References Cited

U.S. PATENT DOCUMENTS

| | | | | |
|---|---|---|---|---|
| 6,112,810 | A * | 9/2000 | Bailey | E21B 33/085 166/374 |
| 9,932,786 | B2 | 4/2018 | Chambers et al. | |
| 10,724,325 | B2 | 7/2020 | Yousef et al. | |
| 2016/0138352 | A1* | 5/2016 | Leba | E21B 33/085 166/377 |
| 2017/0051785 | A1* | 2/2017 | Cooper | F16C 33/7886 |
| 2020/0040688 | A1 | 2/2020 | Yousef et al. | |
| 2021/0189828 | A1* | 6/2021 | Dietrich | E21B 33/038 |

OTHER PUBLICATIONS

Written Opinion of the International Searching Authority dated Feb. 23, 2022 in corresponding International Application No. PCT/CA2021/051627 filed Nov. 17, 2021; total 6 pages.

International Preliminary Report on Patentability dated May 16, 2023 in corresponding International Application No. PCT/CA2021/051627 filed Nov. 17, 2021; total 7 pages.

European Search Report dated Sep. 20, 2024 for corresponding European Application No. 21893174.9 filed Nov. 17, 2021; total 7 pages.

* cited by examiner

ROTATING CONTROL DEVICE

CROSS-REFERENCE TO RELATED APPLICATIONS

This application is a continuation application under 35 U.S.C. § 111(a) of International Application No. PCT/CA2021/051627, which claims the benefit of U.S. Provisional Application Ser. No. 63/115,720, filed Nov. 19, 2020, the content of which is hereby incorporated by reference in its entirety.

FIELD

The present disclosure relates to equipment for wellbore operations, and more particularly to rotating control devices.

BACKGROUND

Rotating control devices (RCDs) have been used for many years in the drilling industry for drilling wells. An RCD typically comprises a bearing assembly having a sealing element and a bowl for receiving at least a portion of the bearing assembly therein. The sealing element seals around the outside diameter of a tubular, such as a drill string, casing, or coil tubing, and rotates with the tubular. The tubular may be slidingly run through the RCD whether or not the tubular is rotating. A tubular typically comprises sections with varying outer surface diameters. RCD sealing elements must seal around all of the rough and irregular surfaces of the components of the tubular, such as hardening surfaces, drill pipe, tool joints, and drill collars. The continuous movement of the tubular through the sealing element while the sealing element is under pressure often causes wear of the interior sealing surface of the sealing element. The sealing element may thus be exposed to pressurized fluid and cuttings returning from the wellbore, and in some instances to a significant pressure differential across its body.

In recent years, RCDs have been used to contain annular fluids under pressure, and thereby manage the pressure within the wellbore relative to the pressure in the surrounding earth formation. During such use, the sealing element in the RCD may be exposed to extreme wellbore fluid pressure variations and conditions. The highest demand on the RCD sealing element tends to occur when tripping the tubular out of the wellbore under high pressure. Conventional seals of the RCD sealing element are flexible but often have relatively poor structural integrity. Thus, such seals tend to roll up inwardly during tripping out, which can ultimately lead to premature seal failure.

In some conventional RCDs, axial or radial cap screws are used to secure the sealing element to the body of the bearing assembly. Such screws can become damaged or can damage the bowl of the RCD during installation of the bearing assembly into the bowl. Further, safety wires are sometimes used to tie together the screws to prevent loosening of the screws. However, the installation of safety wires can be considered time consuming and the quality of the installation may vary with the skill level of human installation technicians.

Typically, a clamp or radial cylinders are used to retain the bearing assembly inside the bowl. The required clamping force for retaining the bearing assembly inside the bowl can be provided by a bolt or a hydraulic cylinder. However, installation and removal of bolted clamps requires personnel on site (e.g. under the rig floor), and the bolts may loosen due to vibration caused by drilling operations and/or rotation of the tubular. Hydraulic clamps also have drawbacks. For example, while they can be operated remotely, hydraulic clamps often require manual assistance and visual confirmation by personnel to ensure proper installation. Further, hydraulic clamps require hydraulic power units and long pressurized hoses to provide a constant clamping force, and any power outage and/or leakage of hydraulic fluids can cause the clamp to loosen to the extent that the bearing assembly is no longer secured in the bowl.

Therefore, improvements are continually needed in the design of rotating control devices.

SUMMARY

According to a broad aspect of the present disclosure, there is provided a rotating control device comprising: a bearing assembly having an outer surface; a bowl comprising a first end, a second end, a longitudinal axis, and an inner surface defining an inner bore extending between the first end and the second end of the bowl, the inner bore configured to receive at least a portion of the bearing assembly via the first end; and the rotating control device having: a latched position wherein the at least a portion of the bearing assembly is received in the inner bore of the bowl, and the bearing assembly is secured to the bowl by an interlocking interface between the inner surface of the bowl and the outer surface of the bearing assembly, the interlocking interface formed by a rotation of the bearing assembly in a first direction about the longitudinal axis relative to the bowl; and an unlatched position wherein the bearing assembly is removable from the bowl as a result of the interlocking interface being released by the rotation of the bearing assembly in a second direction about the longitudinal axis relative to the bowl.

In some embodiments, the rotating control device comprises a rotary guide configured to engage and rotate the bearing assembly relative to the bowl.

In some embodiments, the rotating control device comprises an actuator operably coupled to the rotary guide for actuating the rotary guide.

In some embodiments, the actuator is an electric motor.

In some embodiments, the rotary guide and the bearing assembly are configured to provide an alignment profile.

In some embodiments, the rotary guide is an annular member mounted at or near the first end of the bowl, the rotary guide having an opening to provide open access to the inner bore of the bowl.

In some embodiments, the rotary guide comprises one or more keys and the outer surface of the bearing assembly has one or more slots defined thereon, each slot configured to receive one of the one or more keys therein.

In some embodiments, the inner surface of the bowl has a first shoulder extending radially inwardly therefrom, and the outer surface of the bearing assembly has a second shoulder extending radially outwardly therefrom, wherein in the latched position, at least a portion of the first shoulder circumferentially and radially overlaps with at least a portion of the second shoulder to create the interlocking interface; and in the unlatched position, there is no circumferential or radial overlap between the first and second shoulders.

In some embodiments, the rotating control device comprises a rotary guide configured to engage and rotate the bearing assembly relative to the bowl, wherein the rotary guide comprises two keys circumferentially separated by a gap, and the gap is sized to slidingly receive the second shoulder axially therethrough, wherein when the second shoulder is received in the gap, at least a portion of one of the two keys radially overlaps with at least a portion of the second shoulder.

In some embodiments, the rotating control device comprises a security mechanism for restricting rotational movement of the bearing assembly relative to the bowl when the rotating control device is in the latched position.

According to another broad aspect of the present disclosure, there is provided a bearing assembly for use in a rotating control device, the bearing assembly comprising: a housing having an inner surface; a spindle having a first end and a second end, at least a portion of the spindle being rotatably coupled to the inner surface of the housing; a sealing element having an outer surface, the sealing element being threadedly connected to the second end of the spindle; and a retention assembly for restricting rotational movement of the sealing element relative to the spindle.

In some embodiments, the retention assembly comprises a key and a retaining pin, and wherein the sealing element has an outer surface having defined therein a slot and a recess circumferentially aligned with the slot, the recess configured to receive one end of the key while at least a portion of the key is received in the slot and the retaining pin configured to maintain the key in the slot.

In some embodiments, the second end of the spindle has one or more retention shoulders for abutting against the key when the sealing element is rotated relative to the spindle by a predetermined amount.

In some embodiments, the sealing element has a plurality of leaps extending radially outwardly from the outer surface of the sealing element, the plurality of leaps configured to slidingly and sealingly engage the inner surface of the housing.

According to another broad aspect of the present disclosure, there is provided a sealing element for use in a bearing assembly of a rotating control device, the sealing element comprising: a carcass having a central opening and a plurality of fingers; an annular seal attached to the carcass such that the fingers extend axially inside the seal.

In some embodiments, the fingers are circumferentially arranged about the central opening of the carcass.

In some embodiments, the fingers extend axially along about 20% to about 95% of the length of the seal.

According to another broad aspect of the present disclosure, there is provided a sealing element for use in a bearing assembly of a rotating control device, the sealing element comprising: a carcass; and an annular seal attached to the carcass, the annular seal having an outer surface and a plurality of leaps extending radially outwardly from the outer surface.

According to another broad aspect of the present disclosure, there is provided a method for assembling and disassembling a rotating control device, the method comprising: lowering a bearing assembly into an inner bore of a bowl via a first end of the bowl; and rotating the bearing assembly about a longitudinal axis in a first direction relative to the bowl, while at least a portion of the bearing assembly is received in the inner bore of the bowl; determining whether the rotating control device is in a latched position; and upon determining that the rotating control device is in the latched position, stopping rotation of the bearing assembly.

In some embodiments, in the latched position, the rotating control device has an interlocking interface formed between an inner surface of the bowl and an outer surface of the bearing assembly.

In some embodiments, rotating the bearing assembly comprises engaging a rotary guide with the bearing assembly; and actuating the rotary guide.

In some embodiments, prior to rotating the bearing assembly, the method comprises aligning an alignment profile between the rotary guide and the bearing assembly.

In some embodiments, aligning the alignment profile comprises using one or more of: a sensor, a visual indicator on the rotary guide and/or the bearing assembly, and a real-time video stream, to facilitate the aligning.

In some embodiments, one or more of: lowering the bearing assembly, rotating the bearing assembly, determining whether the rotating control device is in the latched position, and stopping rotation are performed remotely by a control system.

In some embodiments, aligning the alignment profile is performed remotely by a control system.

In some embodiments, prior to rotating the bearing assembly, the method comprises determining whether the rotating control device is in a landing position; and stopping lowering of the bearing assembly upon determining that the rotating control device is in the landing position.

In some embodiments, determining whether the rotating control device is in the landing position comprises receiving a signal from a proximity sensor.

In some embodiments, prior to lowering the bearing assembly, the method comprises determining whether a shoulder on an outer surface of the bearing assembly is circumferentially aligned with a gap on an inner surface of the bowl; and if the shoulder is misaligned with the gap, rotating the bearing assembly to align the shoulder with the gap.

In some embodiments, determining whether the rotating control device is in the latched position comprises one or more of: receiving a signal from a proximity sensor, receiving a signal from a torque sensor, and using an encoder to monitor the amount of rotation of the bearing assembly.

In some embodiments, after stopping rotation of the bearing assembly, the method comprises actuating a security mechanism to restrict rotational movement of the bearing assembly relative to the bowl.

In some embodiments, the method comprises: after stopping rotation of the bearing assembly, rotating the bearing assembly about the longitudinal axis in a second direction relative to the bowl; determining whether the rotating control device is in an unlatched position; upon determining that the rotating control device is in the unlatched position, stopping rotation of the bearing assembly; and removing the bearing assembly from the bowl.

In some embodiments, determining whether the rotating control device is in the unlatched position comprises one or more of: receiving a signal from a proximity sensor, receiving a signal from a torque sensor, and using an encoder to monitor the amount of rotation of the bearing assembly.

BRIEF DESCRIPTION OF THE DRAWINGS

Embodiments will now be described, by way of example only, with reference to the accompanying simplified, diagrammatic, not-to-scale drawings. Any dimensions provided in the drawings are provided only for illustrative purposes, and do not limit the scope as defined by the claims. In the drawings:

FIGS. 1A to 1D may be collectively referred to herein as FIG. 1.

FIGS. 2A to 2E may be collectively referred to herein as FIG. 2.

FIGS. 3A to 3E may be collectively referred to herein as FIG. 3.

FIGS. 4A to 4D may be collectively referred to herein as FIG. 4.

FIGS. 9A to 9C may be collectively referred to herein as FIG. 9.

FIGS. 10A and 10B may be collectively referred to herein as FIG. 10.

DETAILED DESCRIPTION

Figure 1B:
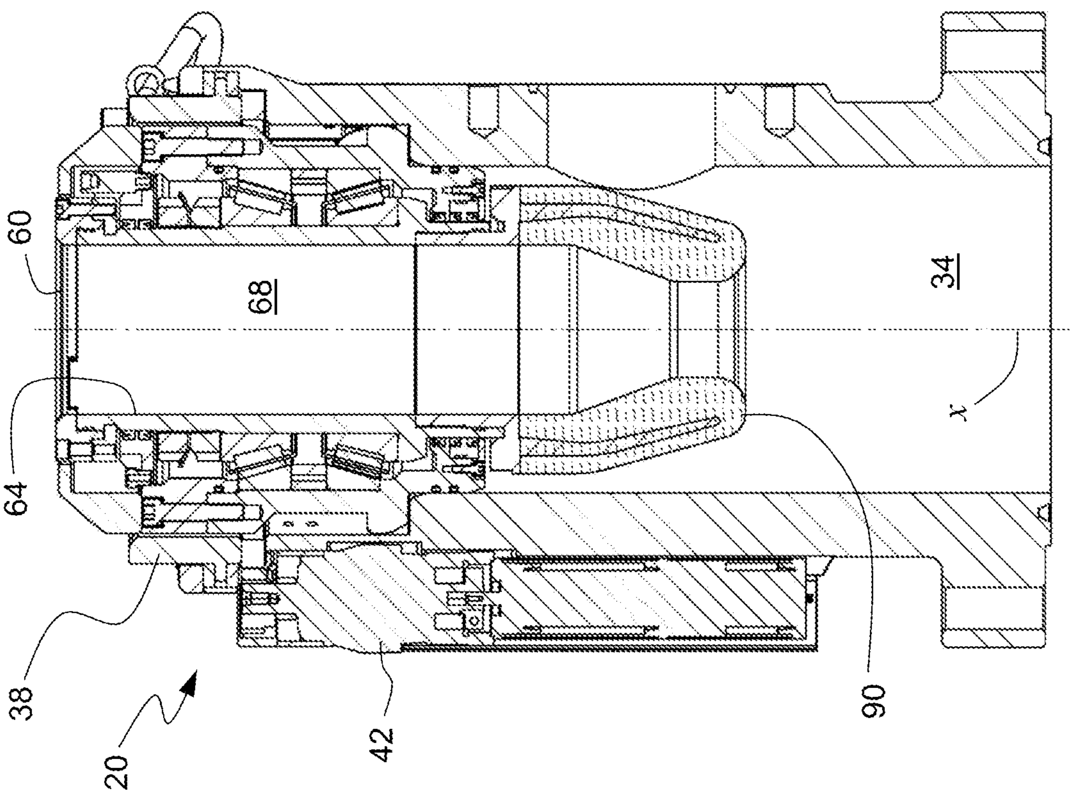
FIG. 1B is a cross-sectional view of the RCD of FIG. 1A, taken along line A-A.
Figure 1A:
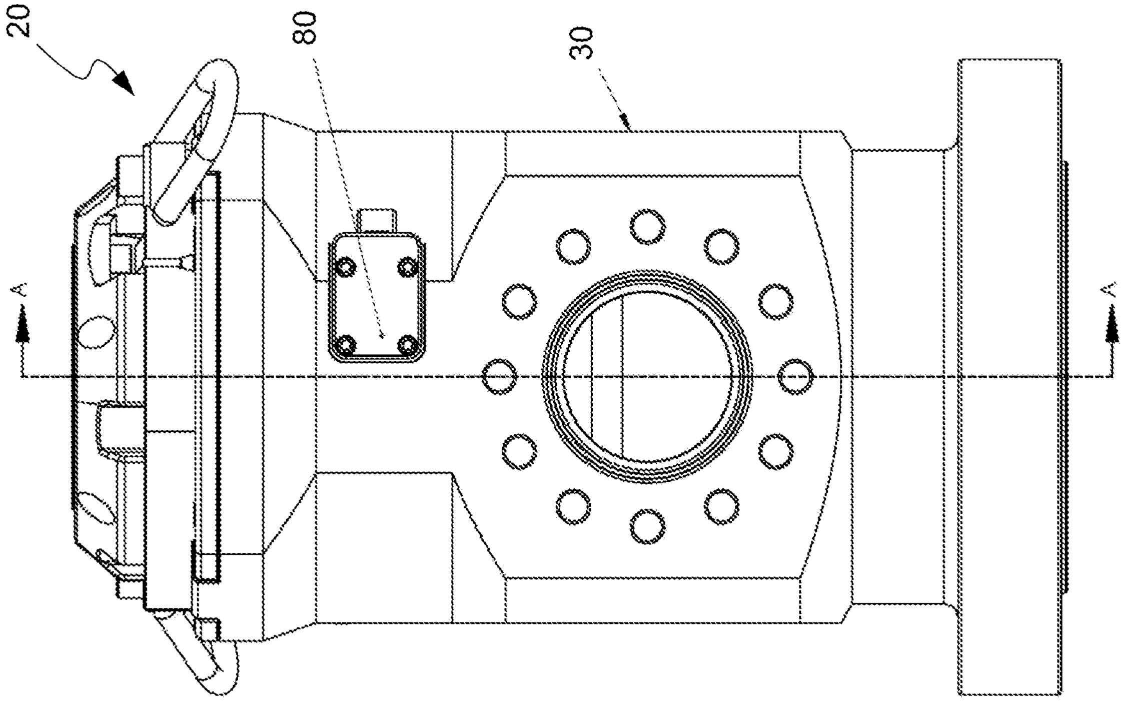
FIG. 1A is a side plan view of a rotating control device (RCD) of the present disclosure, according to one embodiment.

All terms not defined herein will be understood to have their common art-recognized meanings. To the extent that the following description is of a specific embodiment or a particular use, it is intended to be illustrative only, and not limiting. The following description is intended to cover all alternatives, modifications and equivalents that are included in the spirit and scope of the disclosure, as defined in the appended claims.

In general, a rotating control device (RCD) is described herein, wherein the bearing assembly of the RCD can be secured to the bowl by rotationally coupling the bearing assembly with the bowl. When the bearing assembly is rotated in a first direction about a longitudinal axis of the bowl, an interlocking interface can be formed between the inner surface of the bowl and the outer surface of the bearing assembly. The interlocking interface can be released by rotating the bearing assembly in a second direction relative to the bowl. In some embodiments, the bowl comprises a rotary guide for engaging and rotating the bearing assembly. In some embodiments, the rotary guide and the bearing assembly have an alignment profile for facilitating alignment of the bearing assembly with the bowl. In some embodiments, the bearing assembly has a sealing element with axially extending fingers to provide internal structural support for the seal.

In some embodiments, the rotational coupling mechanism of the RCD of the present disclosure can be electrically powered, thereby obviating the need for hydraulic hoses which are prone to leakage, and hydraulic power unit which requires maintenance and additional space on location. Further, once the rotational coupling mechanism is engaged, any loss of electrical power would not affect the integrity of the coupling between the bearing assembly and the bowl. In some embodiments, the alignment profile and/or the electrically powered rotational coupling mechanism may allow a technician to remotely align and/or move the bearing assembly with respect to the bowl such that the physical presence of the technician on the rig floor is not necessary. In some embodiments, the axially extending fingers may provide a supportive framework which may increase the life of the seal of the sealing element. In some embodiments, the bearing assembly may be configured such that the sealing element is positioned closer axially to the rotational coupling (e.g. bearings) between the spindle and the housing than in conventional bearing assemblies, which may reduce the amount of radial reaction forces emanating from the tubular when the RCD is in use. In some embodiments, in case of accidental back spin of the tubular, the RCD of the present disclosure may include a retention assembly to help maintain the connection between the sealing element and the spindle.

FIG. 1 shows an RCD 20 according to one embodiment of the present disclosure. RCD 20 comprises a bowl 30 and a bearing assembly 60. The bowl 30 is configured to receive at least a portion of the bearing assembly 60 therein. The bearing assembly 60 has a sealing element 90 that is configured to sealingly receive a tubular (not shown) therethrough. The bowl 30, the bearing assembly 60, and other components of the RCD 20 are described in detail below.

Referring to FIG. 2, the bowl 30 has a body 32. In some embodiments, body 32 is a generally tubular member having an inner surface defining an axial inner bore 34 (see FIGS. 2C-2E) extending between a first end 35*a* and a second end 35*b* of the body 32. In some embodiments, body 32 has one or more radial bores 36*a*,36*b* (shown in FIGS. 2A-2C) extending through its wall and the one or more radial bores 36*a*,36*b* intersect the inner bore 34 and are in fluid communication with the inner bore 34. The bores 36*a*,36*b* can be configured for connection to one or more flow lines of a drilling system (not shown) and may be used for diverting fluids, such as drilling fluids and/or cuttings, from the RCD. The second end 35*b* can be configured for connection to a blowout preventor stack (not shown) of the drilling system using techniques known to those skilled in the art.

Figure 1D:
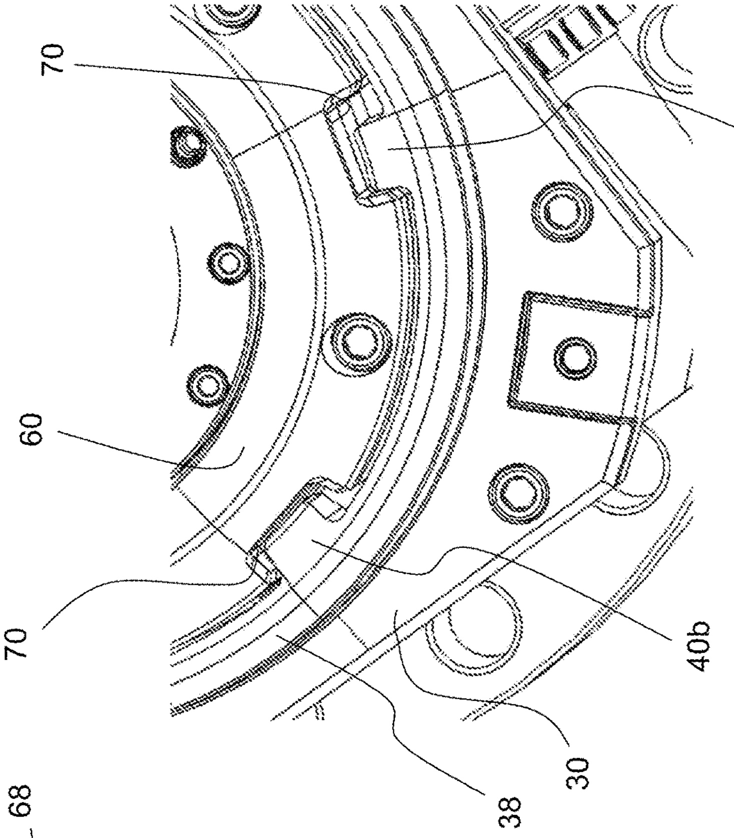
FIG. 1D is a magnified view of a portion of the RCD of FIG. 1C.
Figure 1C:
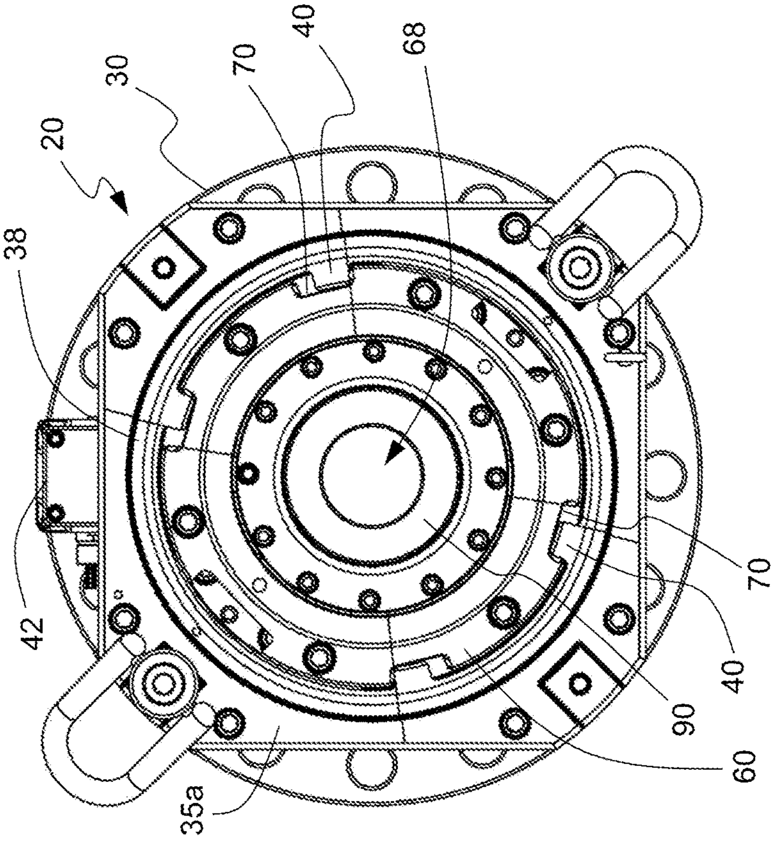
FIG. 1C is a top view of the RCD of FIG. 1A.

As shown, a rotary guide 38 is supported on the body 32 at the first end 35*a*. In some embodiments, guide 38 is a generally annular member having a generally circular opening to allow open access to inner bore 34. The guide 38 is rotatably mounted to the body 32 such that the guide can rotate about a central longitudinal axis x (shown in FIG. 1B) relative to the body. In one embodiment, guide 38 has one or more radially inwardly extending keys 40 (as best shown in FIGS. 1C, 1D, 2A, and 2D). The term “key” may refer to one key or a set of keys. For example, in the illustrated embodiment, as best shown in FIG. 2D, the guide 38 has two sets of keys 40, each set having a respective pair of keys 40*a*,40*b*. Adjacent keys 40 are circumferentially spaced apart and separated by a gap 41 on the inner surface of the guide 38. In other embodiments, the guide 38 has fewer or more keys 40 and the spacing between adjacent keys may vary. In some embodiments, the guide 38 has two keys 40 that are azimuthally separated by about 180°. In some embodiments, the keys 40 are visible from the first end 35*a* of the bowl.

In some embodiments, the RCD comprises an actuator 42 and a rotation mechanism 44 that operate to rotate the guide 38 relative to the body 32. In some embodiments, the rotation mechanism 44 is coupled to and engages the guide 38 for effecting rotation of the guide. The actuator 42 is operably coupled to the rotation mechanism 44 and is configured to actuate the rotation mechanism 44 to cause the rotation mechanism 44 to rotate the guide 38. In the sample embodiment, as best shown in FIG. 2D, the guide 38 has radially outwardly extending teeth along its outer circumference and the rotation mechanism 44 is a pinion gear having teeth configured to engage the teeth of the guide. In the sample embodiment, the actuator 42 is an electric motor attached to a planetary gearbox (not shown) that operates to rotate the pinion gear 44 about a central axis and the rotation of the pinion gear 44 translates to rotation of the guide 38. The gear ratio of the pinion gear 44 and the guide 38 determines how many rotations of the pinion gear 44 are required to rotate the guide 38 by a desired amount. In some embodiments, the gear ratio may range from about 2 to about 50. The actuator 42 and rotation mechanism 44 can thus be calibrated to precisely rotate the guide 38. In some embodiments, the actuator 42 comprises an encoder to help determine and control the position of the pinion gear 44. Since the electric motor can be powered via a single electrical wire, using an electrically-driven actuator can eliminate the need to have hydraulic hoses (such as those required by hydraulic clamps), which are prone to leakage. In some embodiments, the actuator 42 is powered by rig power. As a skilled person in the art can appreciate, other types of actuators, rotation mechanisms, and/or other position control mechanisms than those described herein can be used to adjust the position of the guide 38.

Figure 2B:
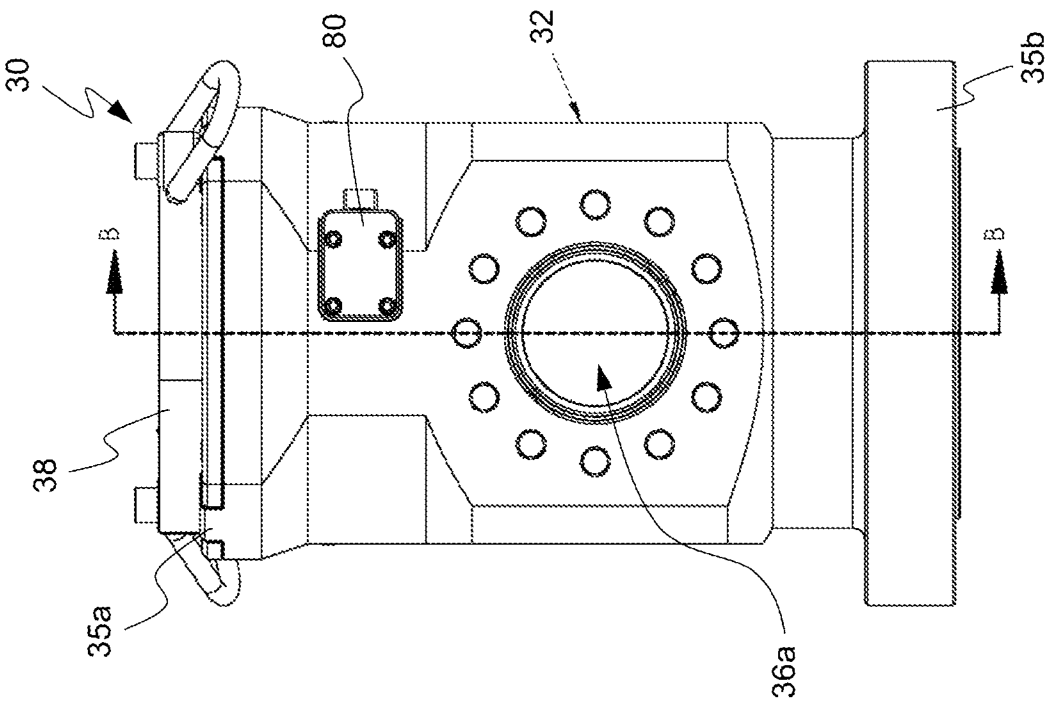
FIG. 2B is a side plan view of the bowl of FIG. 2A.
Figure 2A:
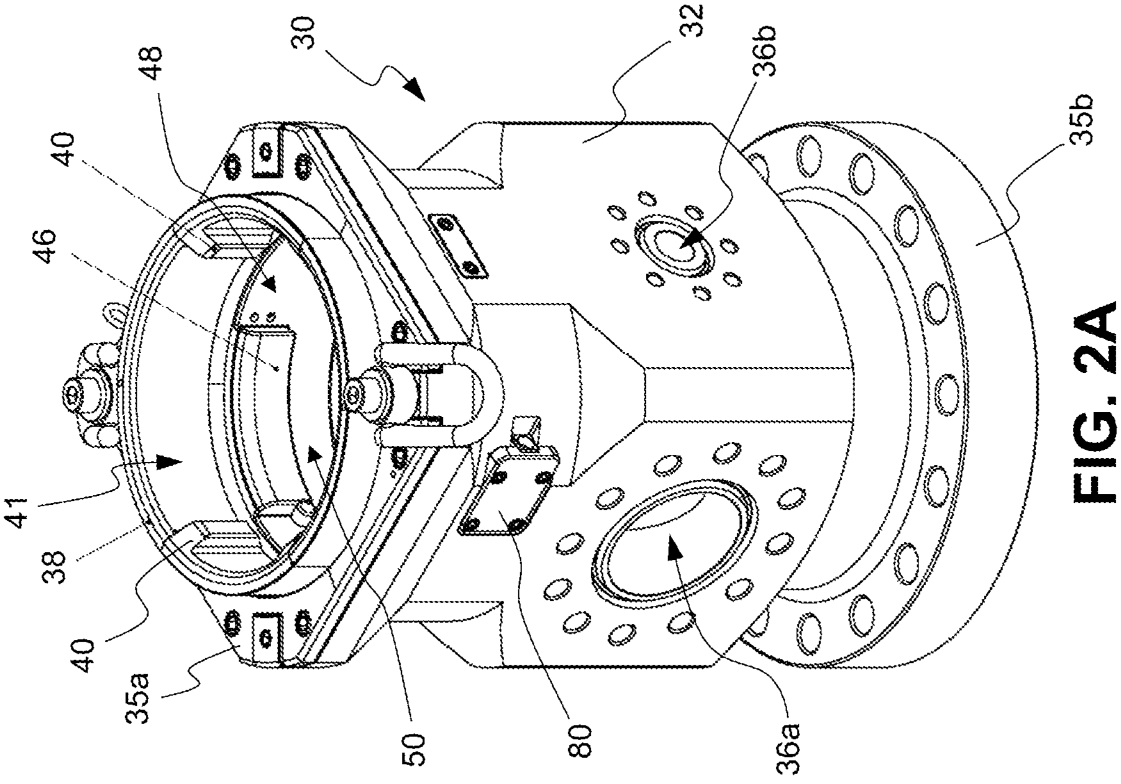
FIG. 2A is a perspective view of a bowl of the RCD of FIG. 1A, according to one embodiment.
Figure 2D:
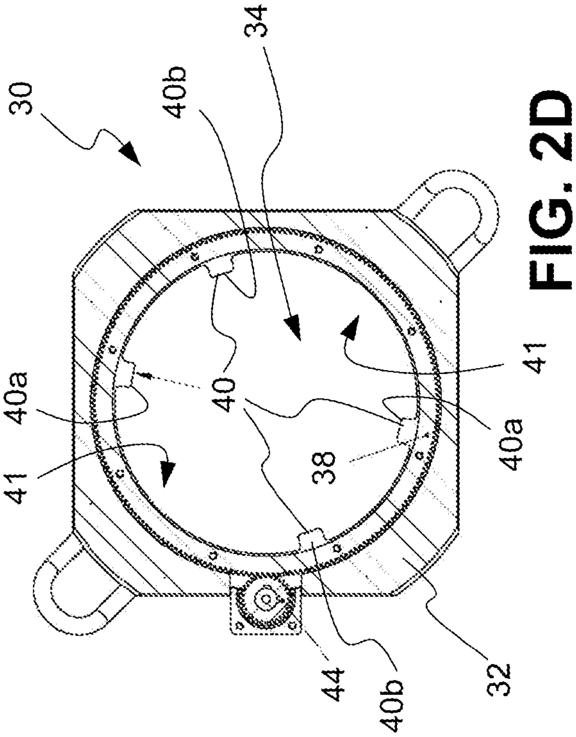
FIG. 2D is a cross-sectional view of the bowl of FIG. 2C, taken along line C-C.
Figure 2E:
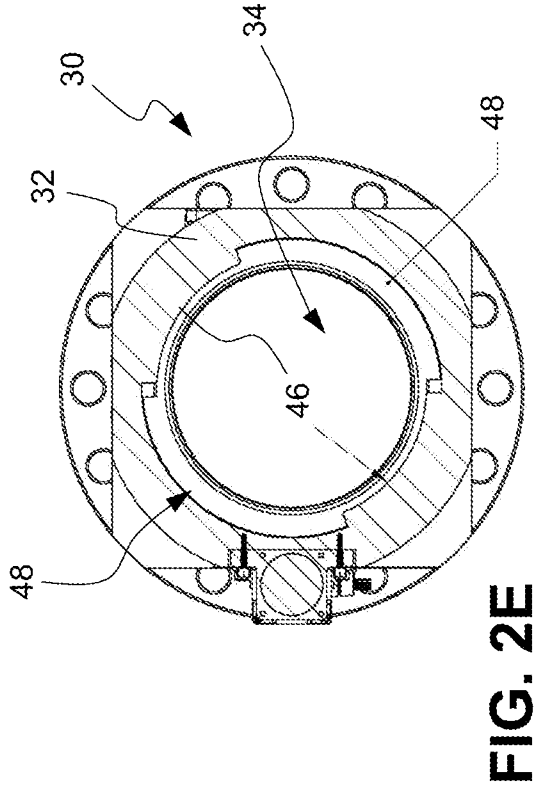
FIG. 2E is a cross-sectional view of the bowl of FIG. 2C, taken along line D-D.
Figure 2C:
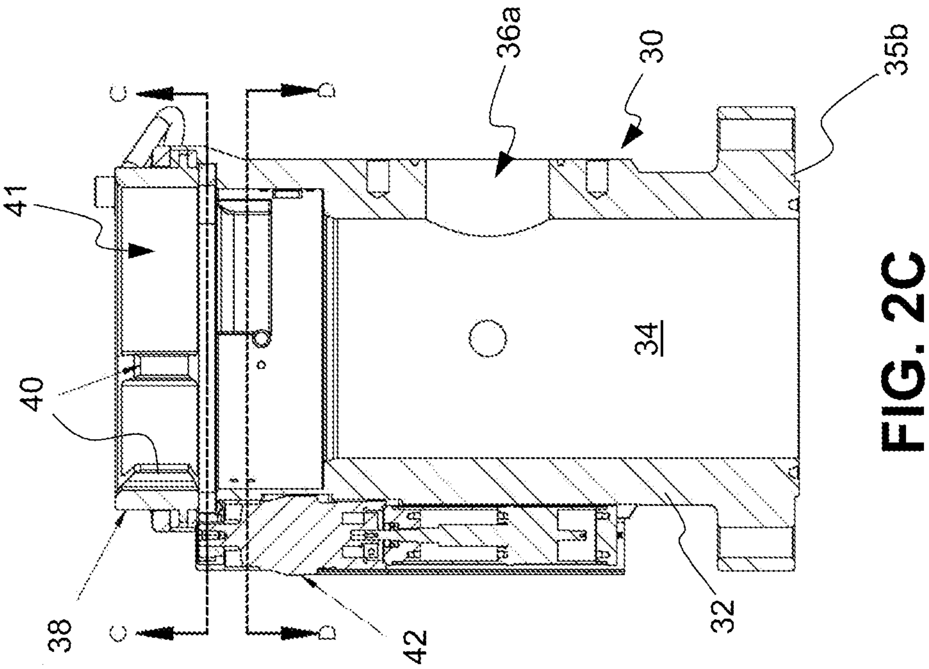
FIG. 2C is a cross-sectional view of the bowl of FIG. 2B, taken along line B-B.

Below the guide 38, as best shown in FIGS. 2A and 2E, one or more shoulders 46 extend radially inwardly from the inner surface of the body 32. In the illustrated embodiment, the body 32 has two shoulders 46 on its inner surface and the two shoulders 46 are azimuthally separated by gaps 48. In the illustrated embodiment, the two shoulders 46 are positioned on opposite sides of the inner surface of body 32. In other embodiments, the body 32 may have fewer or more shoulders 46 and the positions of shoulders 46 may vary. In some embodiments, each shoulder 46 extends axially along a portion of the inner bore 34 and a recess 50 is defined on the inner surface of body 32 below shoulder 46 (best shown in FIG. 2A). In some embodiments, the surface of gap 48 is flush with that of recess 50.

Figure 5:
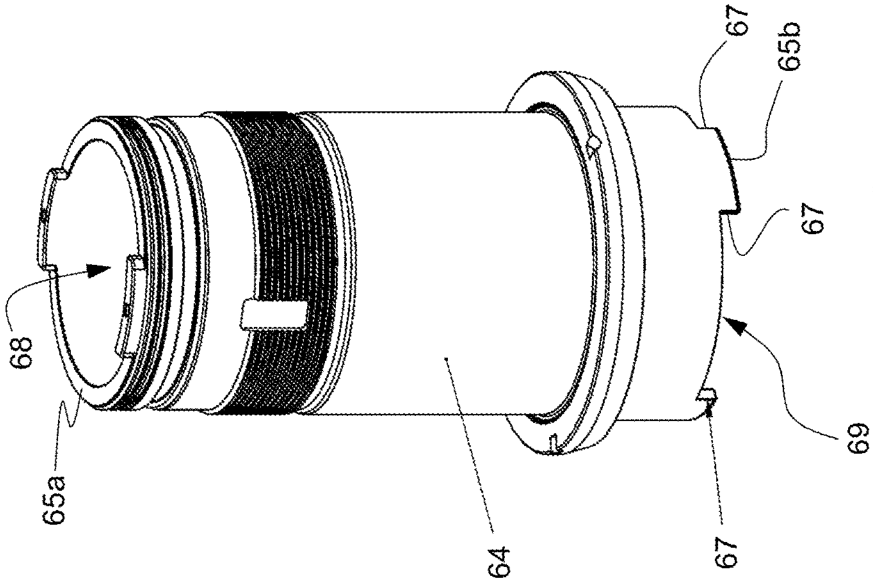
FIG. 5 is a perspective view of a spindle of the bearing assembly of FIG. 3B, according to one embodiment.

With reference to FIG. 3, the bearing assembly 60 generally comprises a housing 62, a spindle 64 mounted in and extending axially through the housing 62, and a sealing element 90 releasably attached to the spindle 64. The spindle 64 and the housing 62 are rotatably coupled to one another, for example by bearings or any of the various ways known to those skilled in the art, such that the spindle 64 can rotate about axis x relative to the housing 62. In some embodiments, as shown in FIG. 5, spindle 64 is a generally tubular member having an inner surface defining an axial inner bore 68 that extends from a first end 65*a* to a second end 65*b* of the spindle 64. The second end 65*b* of the spindle 64 is configured for connection to the sealing element 90. In the sample embodiment shown in FIG. 3B, the second end 65*b* is internally threaded for threaded connection with an externally threaded portion of the sealing element 90. The sealing element 90 is described in more detail below.

Figure 3B:
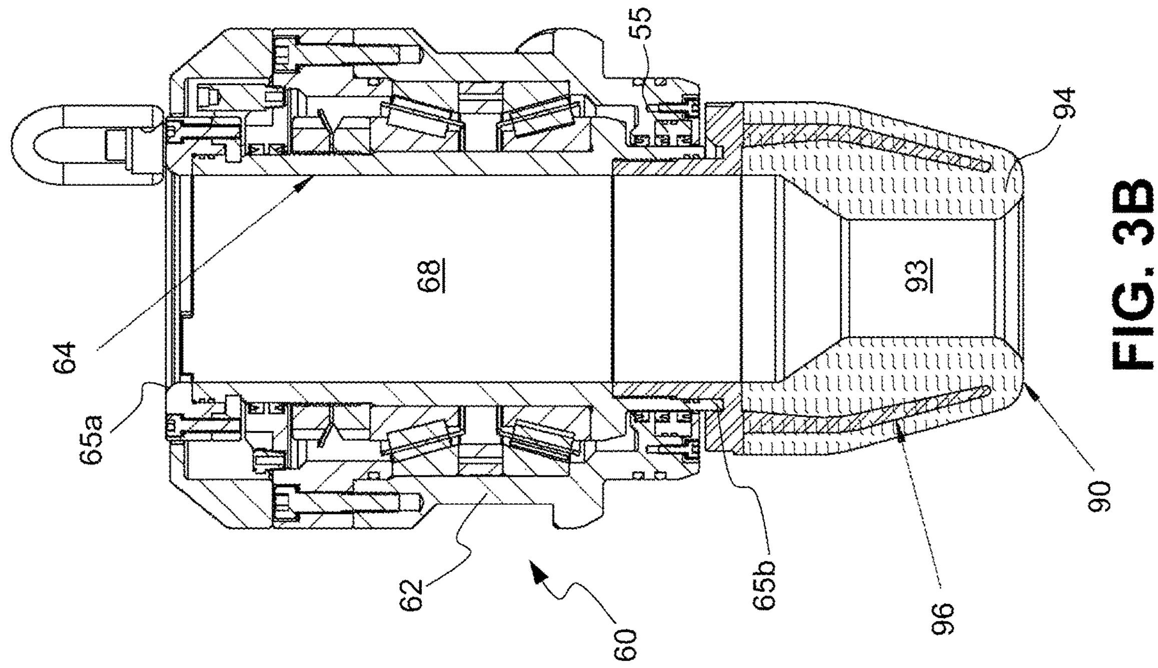
FIG. 3B is a cross-sectional view of the bearing assembly of FIG. 3A, taken along line E-E.
Figure 3A:
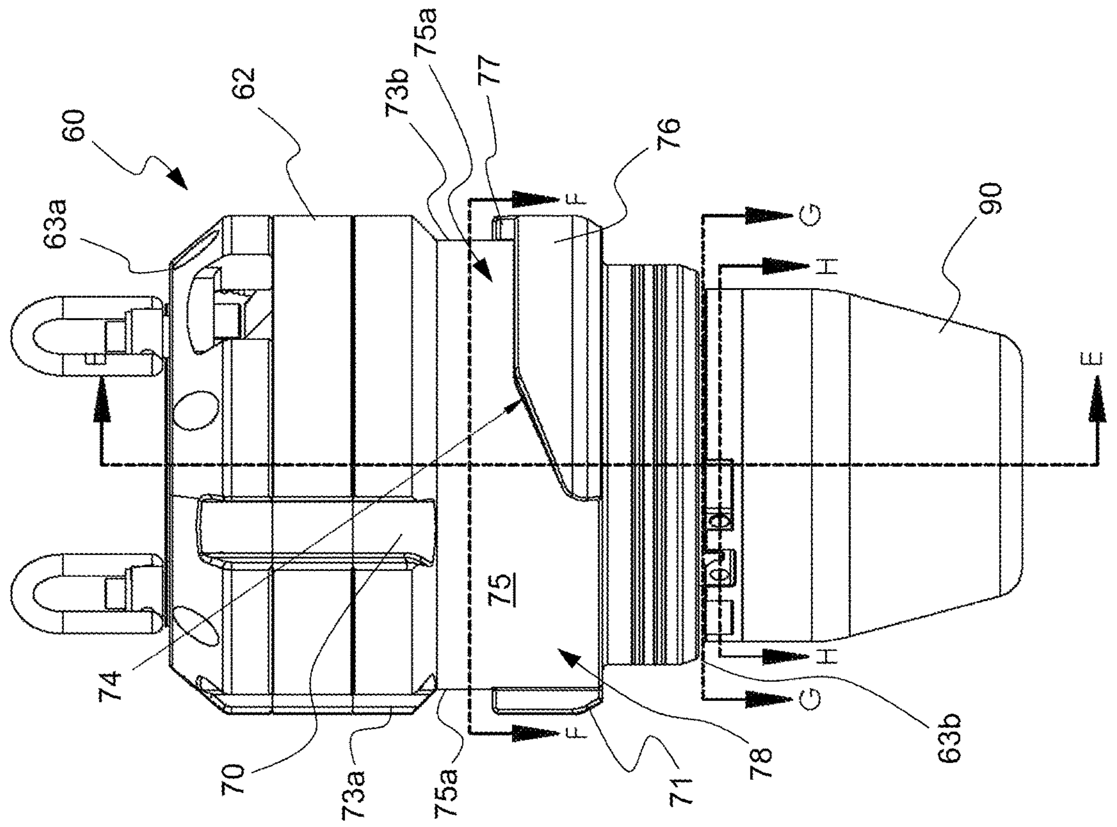
FIG. 3A is a side plan view of a bearing assembly of the RCD of FIG. 1A, according to one embodiment.

Referring back to FIG. 3, the housing 62 has a first end 63*a* and a second end 63*b*. In some embodiments, the spindle 64 extends from about the first end 63*a* to about the second end 63*b* of the housing 62. In some embodiments, as best shown in FIG. 3A, the housing 62 has an upper portion 73*a* adjacent the first end 63*a* and a lower portion 73*b* that is adjacent the second end 63*b*. In some embodiments, at least a portion of the outer surface of each of the upper and lower portions 73*a*,73*b* is generally cylindrical in shape. The upper portion 73*a* has defined on its outer surface one or more axially extending slots 70, each configured for slidingly and matingly receiving one of the one or more keys 40 (as best shown in FIGS. 1C and 1D). The term “slot” may refer to one slot or a set of slots. For example, in the illustrated embodiment, key 40 is a set of two keys 40*a*,40*b*, so each slot 70 is a set of two slots configured to accordingly accommodate the keys 40*a*,40*b*. In some embodiments, the upper portion 73*a* has two slots 70 that are azimuthally separated by about 180°. In other embodiments, the upper portion 73*a* has fewer or more slots 70 and the spacing between adjacent slots may vary. In some embodiments, one end of each slot 70 is visible from the first end 63*a* (as shown for example in FIGS. 1C and 1D). In some embodiments, the slots 70 extend from about the first end 63*a* to about the lower portion 73*b*. In one embodiment, the RCD 20 has the same number of keys 40 and slots 70. In other embodiments, the RCD has more slots 70 than keys 40 to facilitate engagement between the bearing assembly 60 and the guide 38.

Still with reference to FIG. 3, the lower portion 73*b* has an outer surface 75 having an effective outer diameter that is less than the effective outer diameter of the upper portion 73*a*. The lower portion 73*b* has one or more shoulders 76 extending radially outwardly from outer surface 75. In some embodiments, the effective outer diameter of the shoulders 76 is about the same as or less than the effective outer diameter of the upper portion 73*a*. In some embodiments, each shoulder 76 has a tapered leading edge 74 at one end and a flat trailing edge 71 at the other end. In further embodiments, at least one of the shoulders 76 has an axially raised shoulder 77 at or near the trailing edge 71, facing towards the leading edge 74. The axially raised shoulder 77 extends higher axially beyond the remainder of the shoulder 76. In the illustrated embodiment, as best shown in FIG. 3C, the lower portion 73*b* of housing 62 has two shoulders 76 extending from outer surface 75 and the two shoulders are azimuthally separated by gaps 78. In the illustrated embodiment, the two shoulders 76 are positioned on opposite sides of the lower portion 73*b*. In other embodiments, the lower portion 73*b* may have fewer or more shoulders 76 and the positions of shoulders 76 may vary. In some embodiments, each shoulder 76 extends axially only along a portion of the lower portion 73*b* such that some of the outer surface 75 that is radially recessed from the shoulders 76 is exposed above shoulders 76 (best shown in FIG. 3A). The areas of the outer surface 75 exposed above shoulders 76 are denoted by reference number 75*a*. In some embodiments, the surface of gap 78 is flush with that of outer surface 75. In some embodiments, as best shown in FIG. 3A, each slot 70 of the upper portion 73*a* is circumferentially aligned with one of the gaps 78, to provide unobstructed access to a second end of the slot 70 by one of the keys 40 when the bearing assembly 60 is inserted into the bowl 30, which is described in more detail below.

In some embodiments, with reference to FIGS. 2 and 3, at least one gap 41 between two adjacent keys 40 of guide 38 is sized to slidingly receive a shoulder 76 of housing 32 therethrough. For example, if there are two shoulders 76 on the bearing assembly 60, at least two gaps 41 are arranged circumferentially to align with the two shoulders 76 and are sized to allow the shoulders 76 to be received and slidingly pass therethrough at the same time, when the bearing assembly 60 is inserted into bowl 30. In further embodiments, the inner diameter of the opening of guide 38 and the effective outer diameter of shoulders 76 are configured such that when shoulders 76 are received in the gaps 41, the flat trailing edge 71 of each shoulder 76 radially overlaps with at least a portion one of the keys 40 so that the edge 71 can be in abutting engagement with one side of the key 40.

In further embodiments, with further reference to FIGS. 1C, 1D, the inner diameter of the opening of guide 38 and the gaps 41 are sized and circumferentially positioned to matingly accommodate upper portion 73*a* of housing 62 when keys 40 are received in slots 70 (as best shown in FIG. 1C). In further embodiments, each of the gaps 48 of the body 32 is sized to slidingly receive therethrough one of the shoulders 76 and each of the gaps 78 of housing 62 is sized to slidingly receive therethrough one of the shoulders 46 of body 32. In some embodiments, the body 32 and housing 62 have the same number of shoulders 46,76, respectively, and the same number of gaps 48,78, respectively. In some embodiments, at least a portion of area 75*a* above each of the shoulders 76 is sized to receive one of shoulders 46. In some embodiments, recess 50 on the inner surface of body 32 below each of the shoulders 46 is sized to receive one of shoulders 76.

In further embodiments, the keys 40 and slots 70 are circumferentially positioned on the guide 38 and housing 62, respectively, such that when keys 40 are circumferentially aligned with shoulders 46 of body 32 and slots 70 are circumferentially aligned with keys 40, each of shoulders 46 and shoulders 76 is substantially aligned with a corresponding gap 78,48, respectively, such that shoulders 46 and shoulders 76 can move past one another axially when the bearing assembly 60 is lowered into inner bore 34 of the bowl 30 via the opening in guide 38, as described in more detail below.

With reference to FIG. 4, the sealing element 90 comprises a carcass 92 and a seal 94 securely attached to the carcass. The sealing element 90 has a first end 95*a* and a second end 95*b*, and an axial inner bore 93 extending between and opening to the first and second ends 95*a*,95*b*. In some embodiments, a first end of the carcass 92 coincides with the first end 95*a*. In the illustrated embodiment, the first end of the carcass 92 (or the first end 95*a*) is configured for connection with the second end 65*b* of spindle 64 (see FIG. 3B). In some embodiments, the first end of carcass 92 (or first end 95*a*) is configured to threadedly connect with the second end 65*b* of spindle 64. In a sample embodiment, the first end of carcass 92 (or first end 95*a*) has an externally threaded portion 98 for connection with an internally threaded portion of the spindle 64 via second end 65*b*. As best shown in FIG. 3B, when the sealing element 90 is connected to the spindle 64, inner bore 93 is substantially concentrically aligned with and in communication with inner bore 68 of spindle 64.

In some embodiments, as best shown in FIGS. 3D, 4C, 4D, and 7, the carcass 92 has a ledge 100 adjacent to the first end 95*a*. The ledge 100 has defined thereon at least one radially-extending central slot 102 and a respective lateral slot 104 on each side of the central slot 102. Each lateral slot 104 is separated from the central slot 102 by a wall 107 having an aperture 108 extending therethrough. The central slot 102 has an open end and the other end of slot 102 is in communication with a respective recess 106 defined on the outer surface of carcass 92, below the threaded portion 98 thereof.

Figure 6:
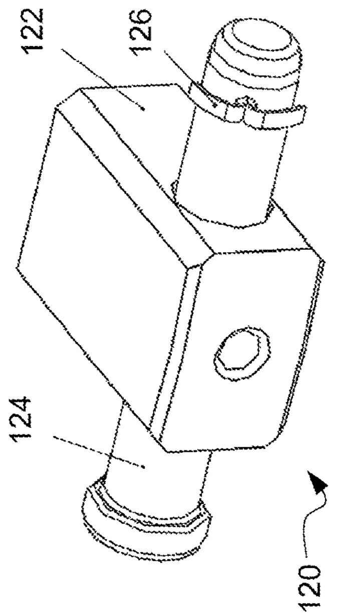
FIG. 6 is a perspective view of a retention assembly for securing the sealing element to the spindle, according to one embodiment.

With further reference to FIGS. 3B, 3E, 6, and 7, when the sealing element 90 is connected to the spindle 64 at the first end 95*a* and second end 65*b*, respectively, the sealing element 90 may be further secured to the spindle by a retention assembly 120 (FIG. 6). The retention assembly 120 is configured to restrict rotational movement of the sealing element 90 relative to the spindle 64, to help prevent unthreading of the connection between the two components. In some embodiments, as best shown in FIG. 6, the retention assembly 120 comprises a key 122, a retaining pin 124, and a cotter pin 126. The key 122 has a lateral bore extending therethrough for receiving the retaining pin 124. A first end of the retaining pin 124 has a lateral bore extending therethrough for receiving the cotter pin 126. In the illustrated embodiment, a second end of pin 124 is a flathead having a greater outer diameter than the remaining portion of the pin 124.

Figure 3E:
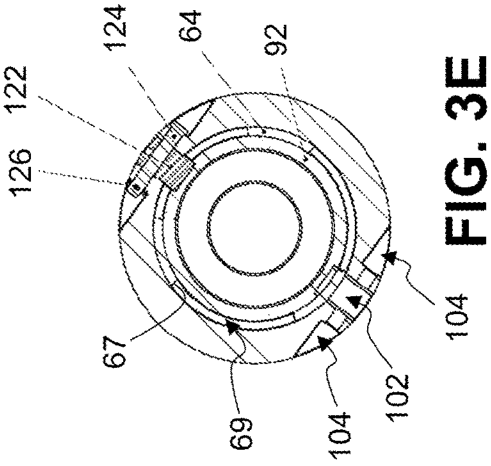
FIG. 3E is a cross-sectional view of the bearing assembly of FIG. 3A, taken along line H-H.
Figure 3D:
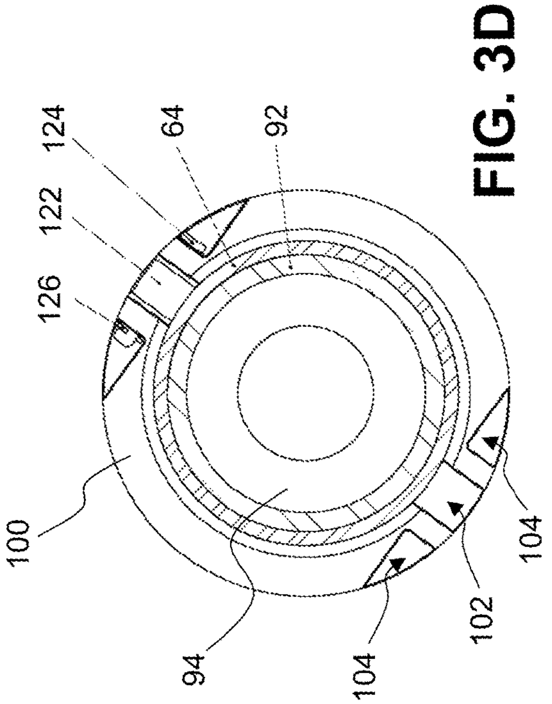
FIG. 3D is a cross-sectional view of the bearing assembly of FIG. 3A, taken along line G-G.
Figure 3C:
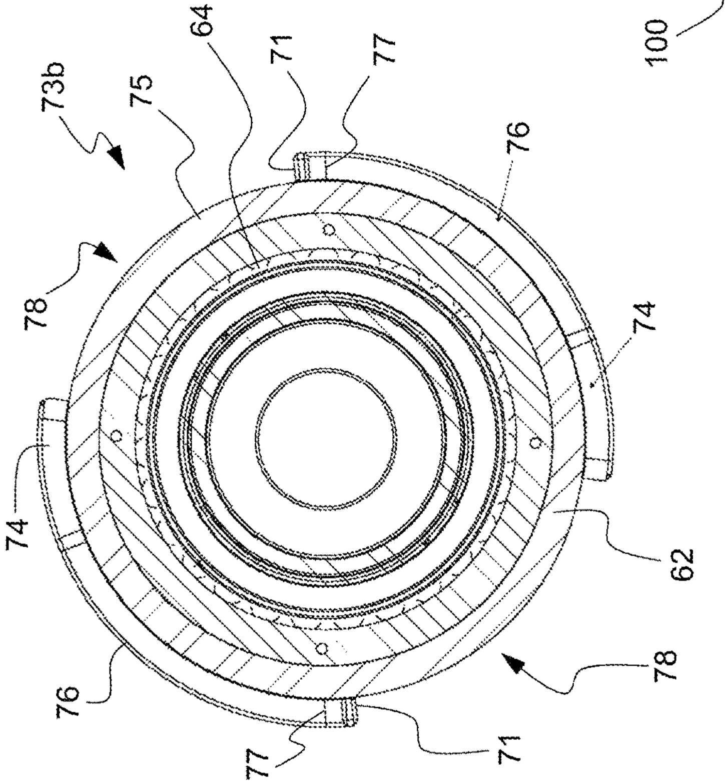
FIG. 3C is a cross-sectional view of the bearing assembly of FIG. 3A, taken along line F-F.
Figure 7:
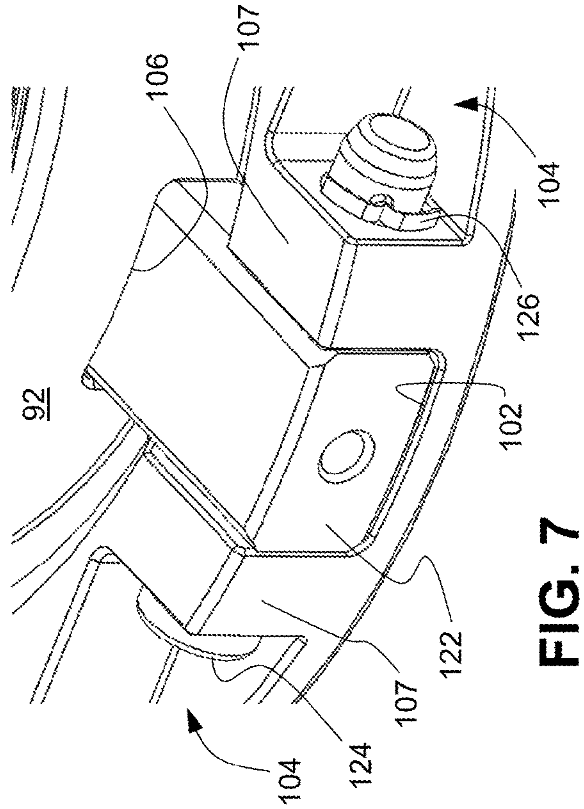
FIG. 7 is a magnified perspective view of the retention assembly of FIG. 6 installed in the sealing element, according to one embodiment.

With reference to FIGS. 3E, 4C, 4D, 6, and 7, the key 122 is configured to fit in the central slot 102 of the carcass 92 such that one end of the key 122 can be inserted into the recess 106 (best shown in FIGS. 3E and 7). In some embodiments, when the one end of key 122 is inserted into recess 106, the holes 108 and the lateral bore of key 122 can be aligned for receiving retaining pin 124 through both holes 108 and the lateral bore of key 122. It can be appreciated that the length and size of the retaining pin 124 are selected so that the pin 124 can extend through the walls 107 and the width of the key 122, with the first end of the pin 124 extending beyond one of the walls 107 and a second end of the pin extending beyond the other wall 107.

In some embodiments, as best shown in FIG. 5, the second end 65*b* of the spindle 64 has two or more retention shoulders 67. Adjacent retention shoulders 67 are azimuthally separated by a gap 69 defined on the second end 65*b*. With further reference to FIGS. 3B, 3D, 3E, 4C, 4D, and 7, when the sealing element 90 is (threadedly) connected to the spindle 64, the second end 65*b* is adjacent to and may abut against ledge 100 of carcass 92. In some embodiments, the shoulders 67 are arranged about the second end 65*b* such that, when the sealing element 90 is connected to the spindle 64, at least one central slot 102 and its corresponding recess 106 can be positioned circumferentially between two adjacent retention shoulders 67 (i.e., azimuthally aligned with one of the gaps 69). Further, the wall of the spindle 64, where shoulders 67 are positioned, is placed radially between the recess 106 and the walls 107, such that the inner surface of spindle 64 is adjacent to the recess 106 while the outer surface of spindle 64 is adjacent to the holes 108.

As best shown in FIGS. 3E and 7, the retention assembly 120 can operate with carcass 92 and the spindle 64 to help further secure the connection between the sealing element 90 and the spindle 64, by restricting the rotational movement of the sealing element 90 relative to the spindle 64. For example, when the sealing element 90 and the spindle 64 are connected, the key 122 can be placed into central slot 102, with one end of the key 122 extending into the recess 106 and the lateral bore of the key 122 aligned with the holes 108. Retaining pin 124 can then be inserted, via its first end, through the holes 108 and the lateral bore of key 122, to help keep key 122 in the central slot 102. In some embodiments, the flathead at the second end of retaining pin 124 is sized to be larger than the holes 108 such that the flathead cannot fit through the holes 108. When the flathead is close to and/or abuts against the wall on one side of the central slot 102, the first end of the retaining pin 124 extends beyond the other wall on the other side of the central slot 102 such that the lateral bore through the second end of the retaining pin 124 is exposed. The cotter pin 126 can then be inserted into the lateral bore of the retaining pin 124, with at least one end of the cotter pin 126 configured to not fit through the lateral bore of pin 124. For example, as shown in FIG. 6, one end of the cotter pin 126 is split to thereby prevent the pin 126 from completely passing through the lateral bore of pin 124. Together, the flathead of pin 124 and the cotter pin 126 help keep the retaining pin 124 from sliding out of holes 108 and key 122. With the retention assembly 120 in place, as described above, if the sealing element 90 rotates about axis x (shown in FIG. 1B) relative to the spindle 64, the maximum amount of rotation of the sealing element 90 is limited by the shoulders 67 and the key 122, as the sealing element 90 can only rotate in either direction until the key 122 abuts against one of shoulders 67. The retention assembly 120 can thus prevent the sealing element 90 from being inadvertently unthreaded from the spindle 64. It can be appreciated that other configurations of the retention assembly and other ways of further securing the sealing element 90 to the spindle are possible.

Figure 4B:
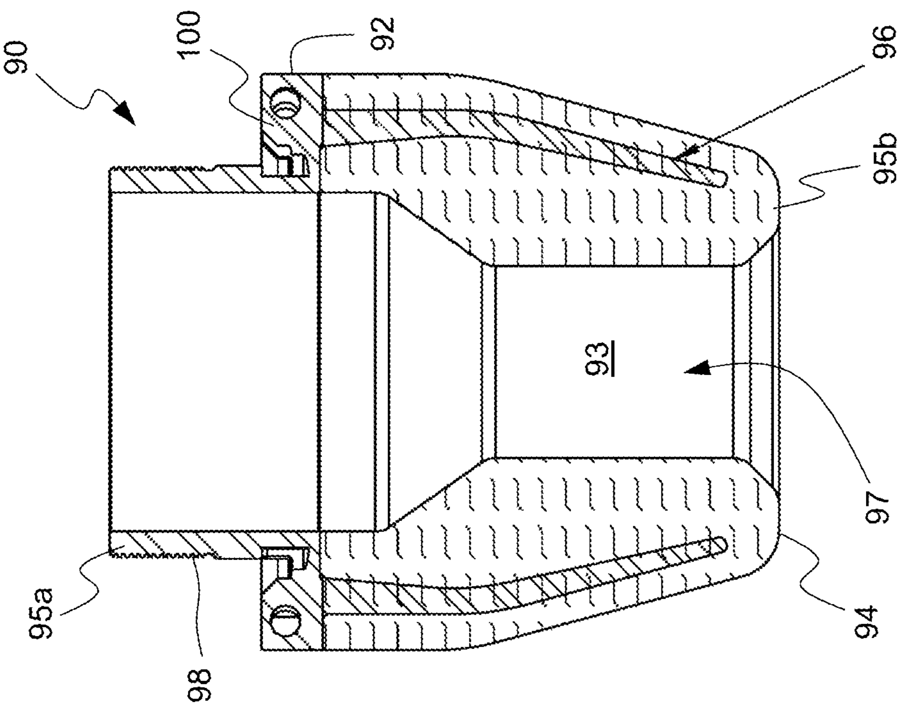
FIG. 4B is a cross-sectional view of the sealing element of FIG. 4A, taken along line L-L.
Figure 4A:
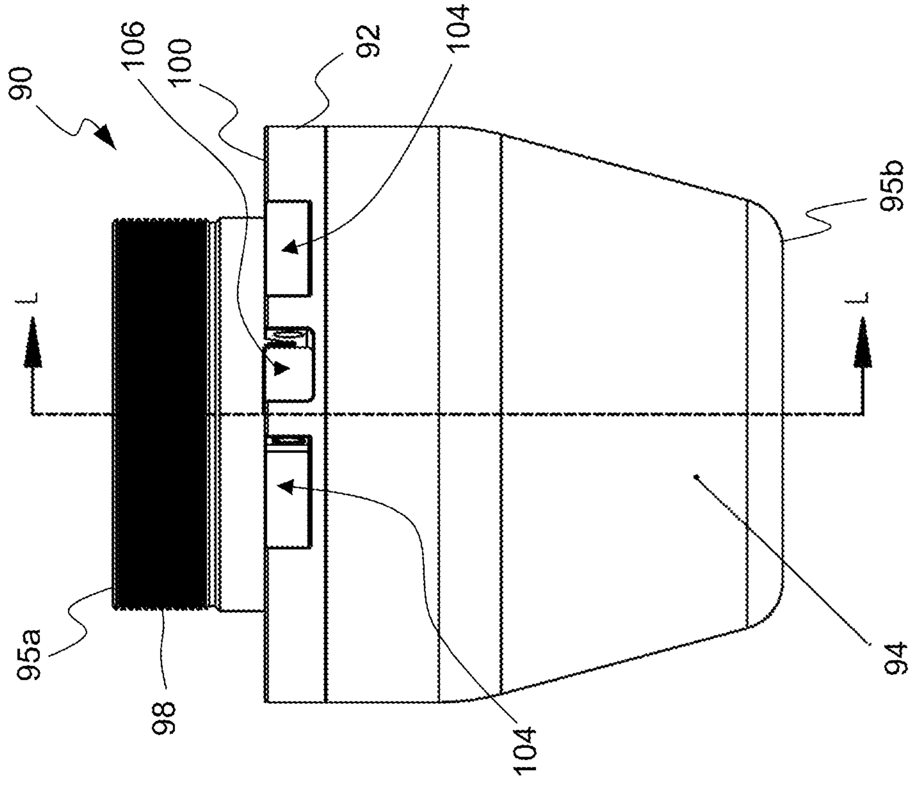
FIG. 4A is a side plan view of a sealing element of the bearing assembly of FIG. 3A, according to one embodiment.
Figure 4D:
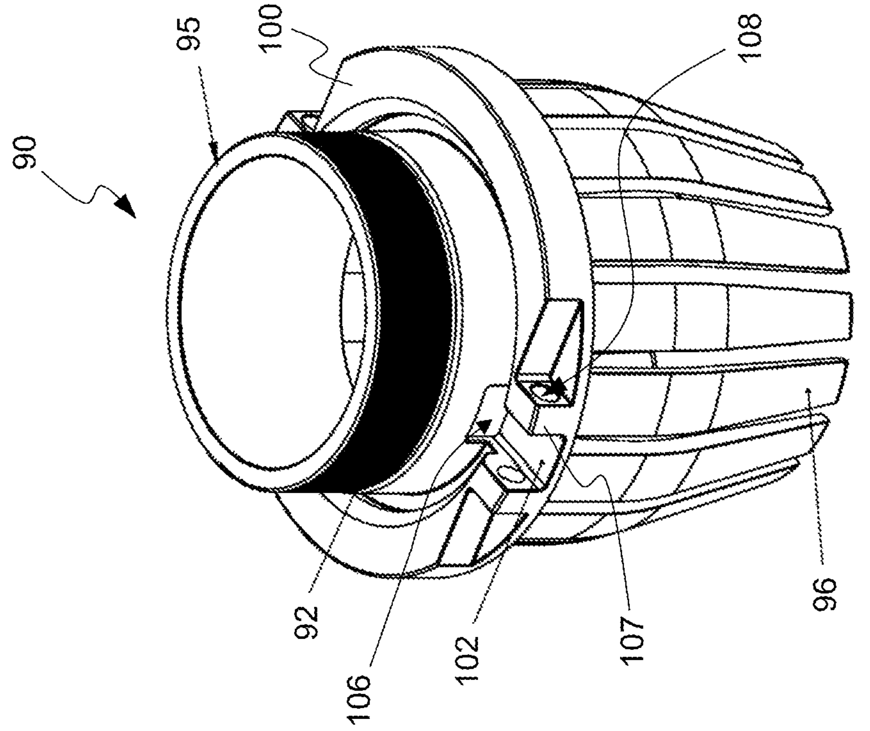
FIGS. 4C and 4D are perspective views of the sealing element of FIG. 4A, shown with and without a seal, respectively.
Figure 4C:
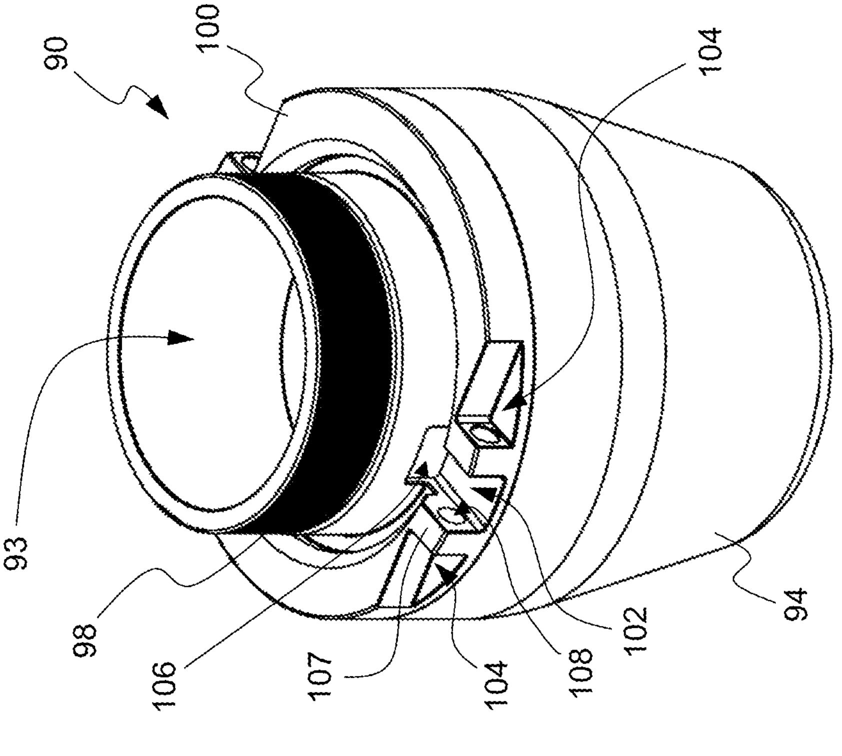

Referring back to FIG. 4, in some embodiments, the seal 94 is an annular seal with a central opening 97 and comprises an elastomeric material. In some embodiments, the carcass 92 is a framework that provides structural support and some structural integrity to the seal 94. In the illustrated embodiment, carcass 92 has a plurality of fingers 96 that are circumferentially arranged to form a cage-like structure. In further embodiments, seal 94 is bonded to the outer surface of fingers 96 such that fingers 96 are circumferentially positioned around the central opening 97 and the opening 97 is substantially concentrically aligned with and in communication with inner bore 93. Fingers 96 are flexible but have some rigidity to allow the fingers to flex from an initial position when a radial or lateral force is exerted thereon and to spring back into the initial position when the force is removed. In some embodiments, the fingers 96 are configured to deflect within the elastic region of the stress-strain curve. In some embodiments, as best shown in FIG. 4B, seal 94 is attached to carcass 92 such that the fingers 96 extend axially inside seal 94 for a substantial length of seal 94 (e.g. almost to the second end 95*b* of the sealing element 90). In some embodiments, the fingers 96 extend axially along about 20% to about 95% of the length of seal 94. The fingers 96 help the seal 94 expand and retract as necessary to maintain radial pressure to sealingly engage a tubular, while accommodating any irregularities on the outer surface of the tubular, as the tubular is extended axially in opening 97 through the seal 94. The seal 94, with the supportive framework of the fingers 96, thus allows the tubular to slidingly move through the inner bore 93, in either axial direction (i.e., downhole and/or uphole), while maintaining a substantial fluid seal around the tubular by the seal 94. The supportive framework provided by the fingers 96 may increase the life of the seal 94 and/or prevent the seal 94 from rolling inwards during tripping out. In some embodiments, the fingers 96 may prevent the seal 94 from collapsing under high pressure by exerting pressure against the tubular towards the second end 95*b* of the sealing element 90.

Figure 8A:
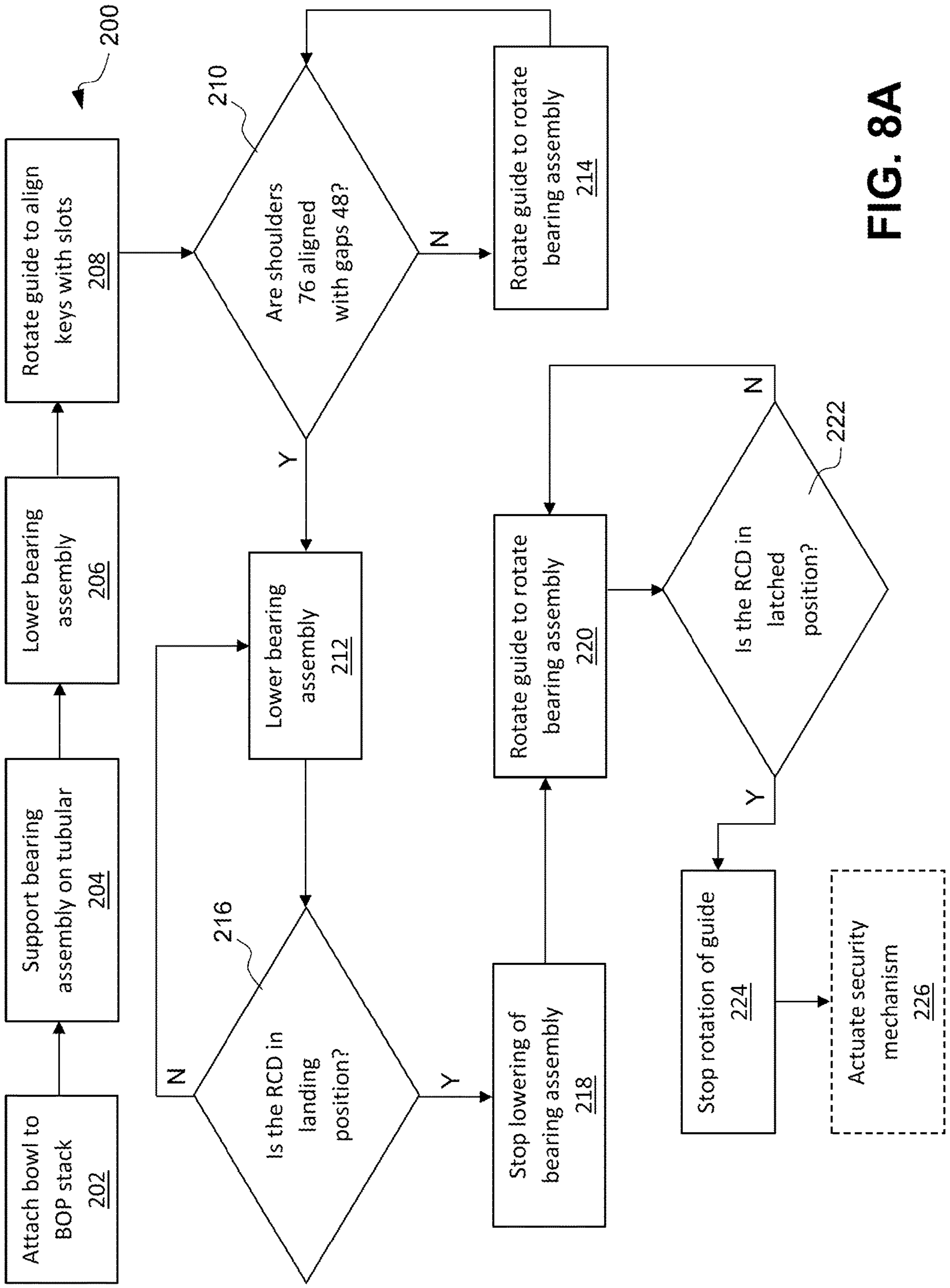
FIG. 8A is a flowchart of a method for latching the RCD of the present disclosure, according to one embodiment.

FIG. 8A illustrates a sample method 200 for installing the bearing assembly 60 into the bowl 30. At step 202, before the bearing assembly 60 is installed into the bowl, the bowl 30 is attached to the upper end of the blowout preventor (BOP) stack of a drilling system. At step 204, the bearing assembly 60 (with the sealing element 90 attached to the spindle as described above) is supported on a tubular (e.g. the drill pipe), with the tubular extending through inner bores 68 and 93 of the spindle 64 and sealing element 90, respectively. The seal 94 of the bearing assembly 60 sealingly engages the tubular. At step 206, the bearing assembly 60 is lowered underneath the rig floor, leading with the sealing element 90. As the bearing assembly 60 is being lowered towards the first end 35*a* of the bowl 30, the guide 38 is rotated as necessary about axis x relative to the body 32 to align the keys 40 with slots 70 of the upper portion 73*a* of housing 62 (step 208). In some embodiments, if there are more slots 70 than keys 40, it may be easier to align the keys 40 with slots 70 as only a small adjustment of the guide's position may be necessary to achieve the alignment. In some embodiments, the rotation of guide 38 can be effected remotely via actuator 42.

In some embodiments, the guide 38, the first end 35*a*, and/or the first end 63*a* of housing 62 may have position sensors and/or visual indicators to facilitate the alignment of the keys 40 with the slots 70. The visual indicators may include, for example, color markings. In a sample embodiments, keys 40 and/or the portion of the guide 38 where the keys are situated may be a different color than the remaining guide 38 and/or the portion of the bearing assembly where the slots 70 are positioned may be a different color from the remaining bearing assembly, to facilitate visual alignment of the keys 40 and the slots 70. In further embodiments, the visual indicators are visible from the first end 35*a* of the bowl 30 and/or the first end 63*a* of the housing 62 such that the visual indicators can be seen, when looking down, from the rig floor.

In some embodiments, an operator can use a control system to (remotely) control the lowering of the bearing assembly 60 and/or the rotation of the guide 38. In some embodiments, the control system is operably coupled to a robotic arm or mechanical crane that operates to move the bearing assembly 60 relative to the bowl. In some embodiments, the control system is operably coupled to the actuator 42 that operates to rotate the guide 38. In some embodiments, the control system may include a handheld radio control, such as a joystick, or a portable computer or a desktop computer for controlling the movement of the bearing assembly 60 and/or rotation of the guide 38. In other embodiments, the control system is configured to automatically control the movement of the bearing assembly 60 and/or the rotation of the guide 38 upon receipt of signals generated by sensors and/or the computer and/or upon receipt of input commands from the operator. In some embodiments, the control system may include a camera for capturing a real-time video stream of the guide 38 and/or the first end 35*a* of the bowl 30 and the bearing assembly 60 as the bearing assembly 60 is lowered into the bowl 30 to, for example, facilitate the alignment of keys 40 with slots 70. The control system may provide the real-time video stream to the portable or desktop computer. In further embodiments, the real-time video stream is shown on a display of the portable or desktop computer for the operator's viewing.

As the bearing assembly 60 is lowered into the bowl 30 at the first end 35*a*, the second end 95*b* of the sealing element 90 enters inner bore 34 first. In some embodiments, the outer diameter of the sealing element 90 is generally smaller than the outer diameter of the remaining bearing assembly 60 so the sealing element 90 can enter inner bore 34 without interference with keys 40 and/or shoulders 46 inside the bowl 30. As the remainder of the sealing element 90 enters the inner bore 34 and as the lower portion 73*b* of the housing 62 approaches the guide 38, the position of guide 38 can be further adjusted as necessary to align the keys 40 with the slots 70. When the slots 70 are aligned with the keys 40, the bearing assembly 60 is continued to be lowered and the shoulders 76 are eventually received in the gaps 41 of guide 38 while keys 40 are received in gaps 78, in between adjacent shoulders 76. At this point, one of two scenarios are possible: (i) if the shoulders 76 are circumferentially aligned with gaps 48 (step 210), then shoulders 46 of the bowl 30 will not obstruct the lower portion 73*b* as it enters inner bore 34 so the bearing assembly 60 can be continued to be lowered into the bowl 30 (step 212), with the shoulders 76,46 sliding past one another axially, via gaps 48,78, respectively, as the bearing assembly is being lowered; or (ii) if the shoulders 76 are circumferentially aligned or overlapped with at least a portion of the shoulders 46 (step 210), the bearing assembly 60 cannot be lowered further when the shoulders 76 abut against shoulders 46. In the latter scenario, the guide 38 is rotated to allow at least one of the keys 40 to push on the flat trailing edge 71 of one of the shoulders 76, to thereby rotate the bearing assembly 60 about axis x relative to the bowl 30 (step 214), until shoulders 76 are aligned with gaps 48 and the bearing assembly 60 can then be lowered further into the bowl 30. When bearing assembly 60 has been lowered enough such that at least a portion of the shoulders 76 have moved axially past the shoulders 46 (step 216), the RCD 20 is in a landing position.

In some embodiments, with reference to FIGS. 1 and 2, the RCD 20 may include a proximity sensor 80 for sensing the position of the bearing assembly 60 relative to the bowl 30. In some embodiments, with reference to FIGS. 1 to 3, the proximity sensor 80 is used to help determine the axial position of at least one of the shoulders 76 relative to the shoulders 46. In some embodiments, the proximity sensor 80 is configured to detect the presence of one of the shoulders 76. In a sample embodiment, as best shown in FIG. 3A, since the shoulders 76 protrude further radially outwardly than the outer surface 75 of the lower portion 73*b* and the outer surface of the sealing element 90, the proximity sensor 80 is configured to determine when the distance between the proximity sensor 80 and the bearing assembly 60 is decreased to a predetermined distance (e.g. the clearance between the inner surface of the bowl and the outer surface of the shoulders 76), as the bearing assembly 60 is lowered into the inner bore 34 of bowl 30. When the predetermined distance is detected by the sensor 80, it indicates that the shoulder 76 is at about the same axial location as the sensor 80. In one embodiment, the proximity sensor is positioned on the outer surface of the body 32 of bowl 30, at an axial location immediately below the shoulders 46 and circumferentially coinciding with one of the gaps 48 and/or adjacent one end of one of the shoulders 46. In this embodiment, when the sensor 80 detects the predetermined distance, it indicates that at least portion of the shoulder 76 is below the shoulders 46 (i.e., the RCD is in the landing position (step 216)) and the lowering of the bearing assembly 60 is stopped (step 218).

In the landing position, at least a portion of the keys 40 of guide 38 is received in the corresponding slots 70 of the housing 62, such that there is some axial overlap between the keys 40 and the slots 70. The keys 40 and slots 70 thus provide an alignment profile between the guide 38 and the bearing assembly 60 (as best shown in FIG. 1C). As mentioned above, when the proximity sensor 80 first detects the shoulders 76 (step 216), the lowering of the bearing assembly 60 is stopped (step 218). At step 220, the guide 38 is then rotated about axis x, for example clockwise when viewed from the first end 35*a*. Due to the alignment profile created by keys 40 and slots 70, the rotation of guide 38 correspondingly rotates the bearing assembly 60. Oher configurations of the alignment profile between the guide 38 and the bearing assembly 60 are possible. For example, the outer surface of the bearing assembly 60 may have radially extending keys and the inner surface of the guide 38 may have slots defined thereon for correspondingly receiving the keys.

The rotation of the bearing assembly 60 moves the shoulders 76 circumferentially relative to the shoulders 46. In some embodiments, if there is some axial overlap between the shoulders 46,76 in the landing position, the leading edge 74 of each shoulder 76 will abut against a side of one of the shoulders 46 when the bearing assembly 60 rotates. As the bearing assembly continues to rotate, the axial force generated by the abutment of the leading edge 74 and the shoulder 46 guides the bearing assembly 60 downward, until shoulders 76 move down axially to clear shoulders 46. In some embodiments, the guide 38 is rotated by an amount sufficient to move at least a portion of shoulders 76 into recesses 50 below shoulders 46. When at least a portion of shoulders 76 are received in recesses 50, at least a portion of shoulders 46 are correspondingly positioned adjacent areas 75*a* above shoulders 76, and the RCD is in a latched position (step 222). In the latched position, at least a portion of each shoulder 76 circumferentially and radially overlap with at least a portion of one of shoulders 46.

In some embodiments, there are several ways to determine whether the RCD is in a latched position (step 222). In some embodiments, the amount of rotation of the guide 38 can be automated, for example, relying on signals from the proximity sensor 80. In the above-mentioned embodiments, the sensor 80, which is positioned near one end of one of the shoulders 46, first detects the presence of the trailing edge 71 of a first shoulder 76 and then generates a first signal to indicate that the RCD is in the landing position (step 216). Upon receipt of the first signal, the lowering of the bearing assembly 60 is stopped (step 218) and then the guide 38 is rotated to turn the bearing assembly 60 relative to the bowl 30 about the common central axis x (step 220). As the bearing assembly 60 is being rotated, the sensor 80 subsequently detects the presence of the leading edge 74 of a second shoulder 76 (i.e., the shoulder 76 adjacent to the first shoulder 76), and generates a second signal to indicate that the second shoulder 76 is fully received in the recess 50 below the shoulder 46 (i.e., the RCD is in the latched position) (step 222). Upon receipt of the second signal, the rotation of guide 38 is stopped (224).

In an alternative or additional embodiment, the actuator 42 may comprise a torque sensor configured to monitor the torque of actuator 42. In this embodiment, at least one of the shoulders 76 has the raised shoulder 77 at or near the trailing edge 71. As the bearing assembly 60 is rotated relative to the bowl 30, one end of one of the shoulders 46 eventually abuts against the raised shoulder 77, thereby restricting further rotation of the bearing assembly 60. With the rotation of the bearing assembly 60 restricted, the continued operation of the actuator 42 causes a rise in torque in the actuator 42, which can be detected by the torque sensor. A rise in torque of the actuator 42 detected by the torque sensor is an indication that the RCD is in the latched position (step 222) and the rotation of the guide 38 is consequently stopped (step 224).

In a further alternative or additional embodiment, the encoder of the actuator 42 can monitor the amount of movement of the actuator 42 to determine how much the guide 38 (and thus the bearing assembly 60) has rotated. Since the approximate angle of rotation from the landing position to the latched position is known (i.e., based on the geometry of the bearing assembly 60 and the bowl 30), the amount of rotation of guide 38 that is necessary to latch the RCD can be predetermined. By tracking the movement of actuator 42 in real-time, the encoder can thus monitor whether the guide 38 has rotated by the predetermined amount. If the guide 38 has rotated by the predetermined amount, the RCD is in the latched position (step 222) and the rotation of the guide 38 is stopped (step 224).

In the latched position, the shoulders 46 and 76 provide an interlocking interface whereby at least a portion of the inner surface of the bowl 30 is engaged with at least a portion of the outer surface of the bearing assembly 60 such that the upward axial movement of the bearing assembly 60 is restricted by shoulders 46 of the bowl 30. While the bowl 30 and bearing assembly 60 described herein have shoulders 46,76, respectively, it can be appreciated that other configurations of the inner surface of the bowl and/or the outer surface of the bearing assembly are possible to allow the bowl and the bearing assembly to rotationally engage one another to provide the interlocking interface for securing the bearing assembly to the bowl. For example, instead of shoulders 46 on the inner surface of the bowl, the bowl may have one or more slots defined on the inner surface for receiving shoulders 76. In another example, instead of shoulders 76 on the outer surface of the bearing assembly, the bearing assembly may have one or more slots defined on the outer surface for receiving shoulders 46.

The bearing assembly and bowl of the present disclosure can be rotationally coupled to one another. In some embodiments, the RCD relies on the interlocking interface between inner surface of the bowl and the outer surface of the bearing assembly that is formed by rotationally engaging the bearing assembly with the bowl, to securely couple the bearing assembly 60 to the bowl 30, rather than an external clamp. Once the RCD is latched, any power loss to the actuator 42 does not result in unlatching of the interlocking interface so the bearing assembly 60 remains secured to the bowl 30.

In some embodiments, the RCD 20 may comprise a security mechanism to help ensure that the interlocking interface cannot be unlatched accidentally. Once the RCD is in the latched position (step 222), the security mechanism can optionally be actuated to further secure the bearing assembly 60 to the bowl 30 (step 226). In a sample embodiment, the security mechanism comprises an anti-rotation pin (not shown) that can be selectively actuated, e.g. electrically or pneumatically, to extend through the wall of the bowl 30, with one end of the anti-rotation pin extending beyond the inner surface of the body 32 at a location that circumferentially aligns with one of the gaps 78, when the RCD is in the latched position. When extended, the one end of the anti-rotation pin radially and axially overlaps with at least one of the shoulders 76 such that if the bearing assembly 60 is inadvertently rotated towards the unlatched position, either the leading edge 74 or the trailing edge 71 will abut against the anti-rotation pin to thereby prevent further rotation of the bearing assembly 60 relative to the bowl 30. The security mechanism thus provides redundancy in securing the engagement between bearing assembly 60 and the bowl 30. When it is desired to release the bearing assembly 60 from the bowl 30, the anti-rotation pin can be retracted to no longer extend beyond the inner surface of the body 32, thereby allowing the unlatching of the interlocking interface.

Figure 8B:
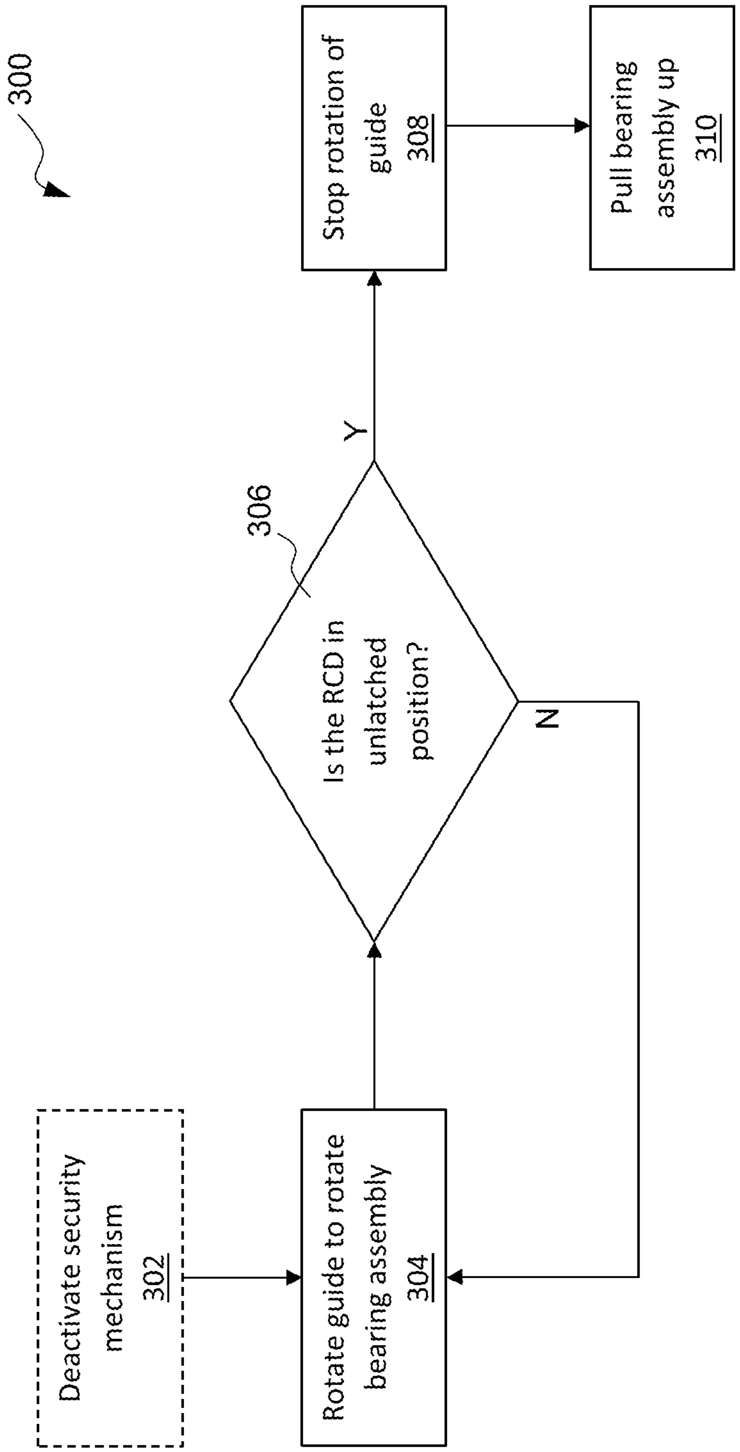
FIG. 8B is a flowchart of a method for removing the bearing assembly from the bowl of the RCD of the present disclosure, according to one embodiment.

FIG. 8B illustrates a sample method 300 for removing the bearing assembly 60 from the bowl 30. At step 302, the optional security mechanism is deactivated if it had been actuated while the RCD is in the latched position. At step 304, the guide 38 is rotated automatically or manually by the about the same amount as that during installation but in the opposite direction (e.g. counterclockwise when viewed from the first end 35*a*) to unlatch the interlocking interface between shoulders 46 and 76. Once the shoulders 76 clear the shoulders 46 and align with the gaps 48, the RCD is in an unlatched position (step 306) and the rotation of the guide 38 is stopped (step 308). In the unlatched position, there is no circumferential or radial overlap between the shoulders 46 and shoulders 76. At step 310, the bearing assembly 60 is pulled up and released from the bowl 30. In some embodiments, the proximity sensor 80 can be used to facilitate the removal of bearing assembly 60 from the bowl 30. For example, as the guide 38 is rotated in the opposite direction, the proximity sensor 80 no longer detects the presence of the leading edge 74 of the second shoulder 76. Sensor 80 subsequently detects the presence of the trailing edge 71 of the first shoulder 76 and generates a third signal indicating that the second shoulder 76 has been removed from the recess 50 (i.e., the RCD is unlatched (step 306)). Upon receipt of the third signal, the rotation of the guide 38 is stopped (step 308).

In an alternative or additional embodiment, the torque sensor can be used to determine whether the RCD is in the unlatched position (step 306). As the bearing assembly 60 is rotated relative to the bowl 30 in the opposite direction, one end of one of the shoulders 46 eventually abuts against the raised shoulder 77, thereby restricting further rotation of the bearing assembly 60. With the rotation of the bearing assembly 60 restricted, the continued operation of the actuator 42 causes a rise in torque in the actuator 42, which can be detected by the torque sensor. In this embodiment, a rise in torque of the actuator 42 detected by the torque sensor indicates that the RCD is in the unlatched position (step 306) and the rotation of the guide 38 is consequently stopped (step 308).

In a further alternative or additional embodiment, since the approximate angle of rotation from the latched position to the unlatched position is known (i.e., based on the geometry of the bearing assembly 60 and the bowl 30 and/or the amount of rotation from the landing position to the latched position previously recorded by the encoder of the actuator 42), the amount of rotation of guide 38 that is necessary to unlatch the RCD can be predetermined. By tracking the movement of actuator 42 in real-time, the encoder can thus monitor whether the guide 38 has rotated by the predetermined amount. If the guide 38 has rotated by the predetermined amount in the opposite direction, the RCD is in the unlatched position (step 306) and the rotation of the guide 38 is stopped (step 308).

In some embodiments, the operator can control the movement of the bearing assembly 60 and/or the rotation of the guide 38 based at least in part on one or more of: signals from the proximity sensor 80, the position sensors, the torque sensor, and the encoder of the actuator, the visual indicators, and the video stream. In other embodiments, the control system may automatically control the movement of bearing assembly and/or the rotation of the guide 38 based at least in part on one or more of: signals from the proximity sensor 80, the position sensors, the torque sensor, and the encoder of the actuator, the visual indicators, and the video stream. As one skilled in the art can appreciate, other ways of facilitating and/or achieving the alignment of keys 40 and slots 70, the latching of the RCD, and the removal of the bearing assembly 60 from the bowl 30 are possible. In some embodiments, at least a portion of method 200 and/or method 300 is fully automated.

When the RCD of the present disclosure is used during drilling operations, the threaded connection between the sealing element 90 and the spindle 64 helps transfer the axial load and torque of the tubular from the sealing element on to the spindle. Since the sealing element 90 threads to the inner surface of the spindle 64, the sealing element 90 is positioned closer axially to the rotational coupling (e.g. bearings) between the spindle 64 and the housing 62 than in conventional RCDs, which may reduce the amount of radial reaction forces emanating from the tubular when the RCD is in use. In some embodiments, in case of an accidental back spin of the tubular, the actuator 42 is configured to detect the counterrotation and apply a reactive torque on the bearing assembly 60. The retention assembly 120 also helps maintain the connection between the sealing element 90 and the spindle 64 in case of a back spin of the tubular.

Figure 9A:
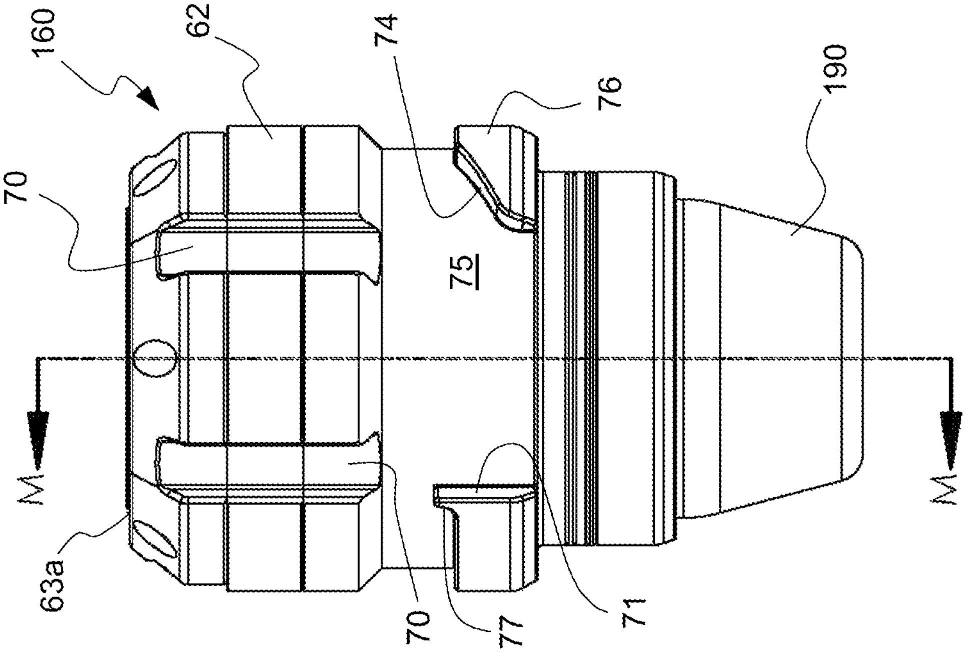
FIG. 9A is a side plan view of a bearing assembly usable with the RCD of the present disclosure, according to another embodiment.
Figure 9B:
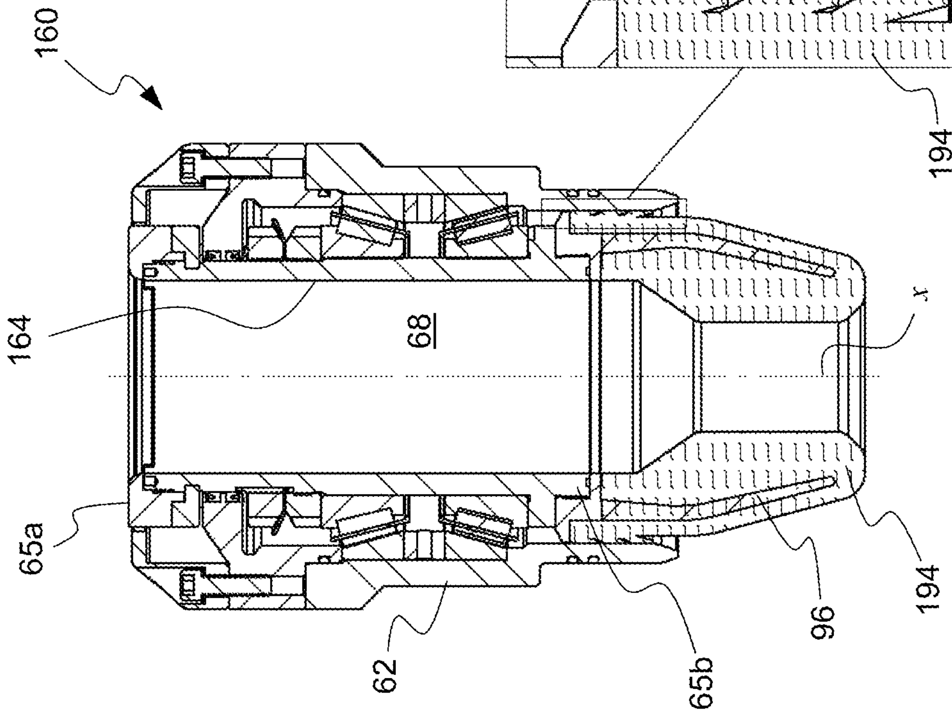
FIG. 9B is a cross-sectional view of the bearing assembly of FIG. 9A, taken along line M-M.
Figure 9C:
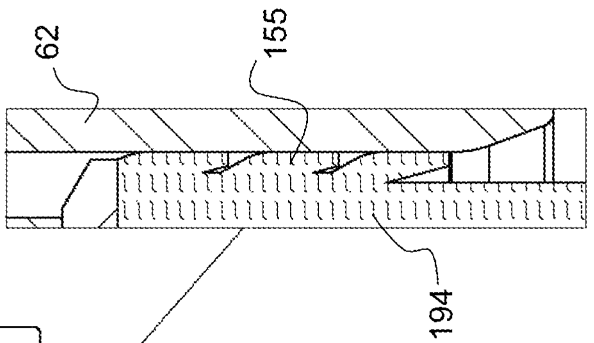
FIG. 9C is a magnified view of a portion of the bearing assembly of FIG. 9B.
Figure 10A:
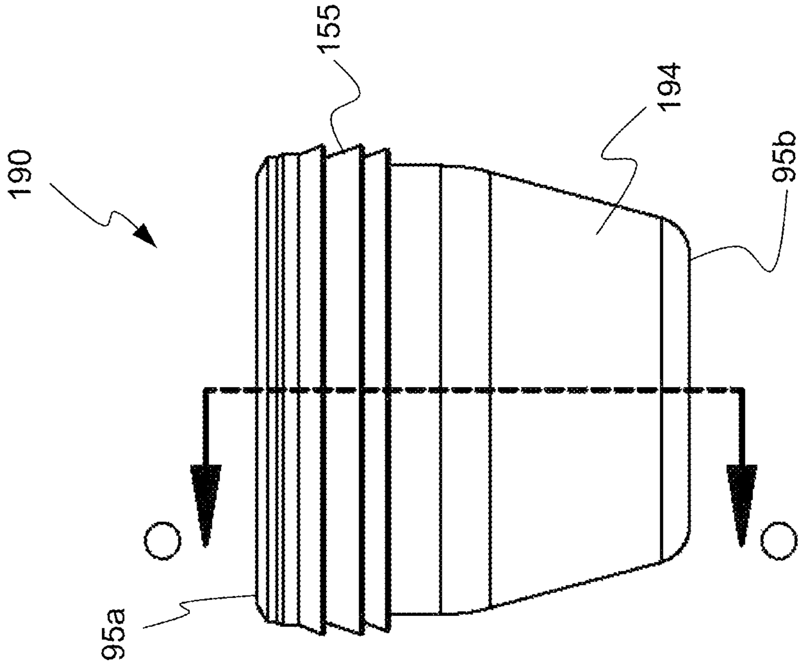
FIG. 10A is a side plan view of the sealing element of the bearing assembly of FIG. 10A, according to one embodiment.
Figure 10B:
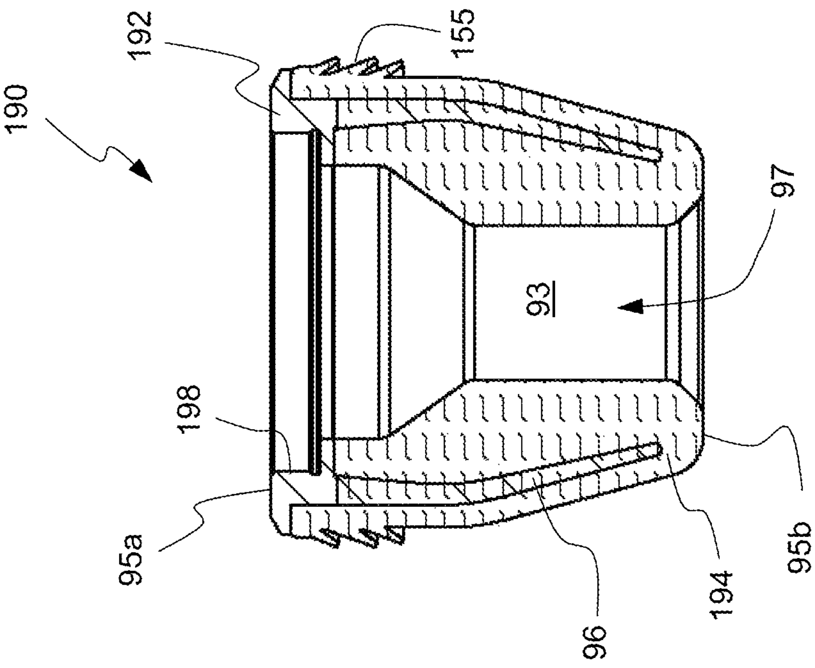
FIG. 10B is a cross-sectional view of the sealing element of FIG. 10A, taken along line O-O.

FIGS. 9 and 10 show an alternative bearing assembly 160 that can be used in RCD 20 instead of bearing assembly 60. Bearing assembly 160 has some similar features as bearing assembly 60. The similar features are denoted by the same reference numbers and are as described above with respect to bearing assembly 60. The bearing assembly 160 differs from bearing assembly 60 in that instead of a conventional rotary seal 55 (FIG. 3B), the sealing element 190 comprises a plurality of leaps 155 that radially outwardly extend from the outer circumference of the sealing element 190. In some embodiments, the leaps 155 are situated at or near the first end 95*a* of the sealing element 190. In some embodiments, the leaps 155 are formed as part of the seal 194 which is molded on to the carcass 192 of the sealing element 190. The seal 194 is sized and configured to allow leaps 155 to slidingly and sealingly engage the inner surface of housing 62 as the spindle 164 rotates about the central axis x relative to the housing 62 during operation. In some embodiments, the carcass 192 has an internally threaded portion 198 at the first end 95*a* and spindle 164 has an externally threaded portion at the second end 65*b* so that the sealing element 190 can be releasably threadedly connected to the spindle 164.

Using leaps 155 rather than a rotary seal 55 reduces the number of mechanical parts in the bearing assembly 160, as compared to bearing assembly 60, thereby simplifying the manufacturing and/or assembly thereof. Further, the sample embodiment as shown in FIGS. 9 and 10 allows the sealing element 90 be to positioned even closer axially to the rotational coupling (e.g. bearings) between the spindle 164 and the housing 62 than in bearing assembly 60, which may further reduce the amount of radial reaction forces emanating from the tubular when the RCD is in use. In some embodiments, the rotary seal 55 may allow sealing element 90 to rotate faster at high pressures.

Unless the context clearly requires otherwise, throughout the description and the "comprise", "comprising", and the like are to be construed in an inclusive sense, as opposed to an exclusive or exhaustive sense; that is to say, in the sense of "including, but not limited to"; "connected", "coupled", or any variant thereof, means any connection or coupling, either direct or indirect, between two or more elements; the coupling or connection between the elements can be physical, logical, or a combination thereof; "herein", "above", "below", and words of similar import, when used to describe this specification, shall refer to this specification as a whole, and not to any particular portions of this specification; "or", in reference to a list of two or more items, covers all of the following interpretations of the word: any of the items in the list, all of the items in the list, and any combination of the items in the list; the singular forms "a", "an", and "the" also include the meaning of any appropriate plural forms.

Where a component is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments.

Various modifications to those embodiments will be readily apparent to those skilled in the art, and the generic principles defined herein may be applied to other embodiments without departing from the spirit or scope of the disclosure. Thus, the present disclosure is not intended to be limited to the embodiments shown herein, but is to be accorded the full scope consistent with the claims. All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples but should be given the broadest interpretation consistent with the description as a whole.

What is claimed is:

1. A rotating control device comprising:

a bearing assembly having an outer surface;

a bowl comprising a first end, a second end, a longitudinal axis, and an inner surface defining an inner bore extending between the first end and the second end of the bowl, the inner bore configured to receive at least a portion of the bearing assembly via the first end;

a rotary guide in the form of an annular member rotatably supported along the first end of the bowl, the rotary guide comprising radially outwardly projecting teeth extending along an outer circumference of the rotary guide that are configured for engagement to cause the rotary guide to be rotated relative to the bowl;

wherein the rotating control device has:

a latched position wherein the at least a portion of the bearing assembly is received in the inner bore of the bowl, and the bearing assembly is secured to the bowl by direct interlocking interface directly between the inner surface of the bowl and the outer surface of the bearing assembly, wherein the direct interlocking interface is formed by a rotation of the bearing assembly in a first direction about the longitudinal axis relative to the bowl; and an unlatched position wherein the bearing assembly is removable from the bowl as a result of the interlocking interface being unformed and released by the rotation of the bearing assembly in a second direction about the longitudinal axis relative to the bowl.

2. The rotating control device of claim 1, wherein the rotary guide is configured to engage and rotate the bearing assembly relative to the bowl.

3. The rotating control device of claim 2 comprising an actuator operably coupled to the rotary guide for actuating the rotary guide.

4. The rotating control device of claim 3, wherein the actuator is an electric motor having a pinion gear connected thereto that is configured to engage the teeth of the rotary guide.

5. The rotating control device of claim 2, wherein the rotary guide and the bearing assembly are configured to provide an alignment profile.

6. The rotating control device of claim 2, wherein the rotary guide has an opening to provide open access to the inner bore of the bowl.

7. The rotating control device of claim 2, wherein the rotary guide comprises one or more keys and the outer surface of the bearing assembly has one or more slots defined thereon, each slot configured to receive one of the one or more keys therein.

8. The rotating control device of claim 1, wherein the inner surface of the bowl has a first shoulder extending radially inwardly therefrom, and the outer surface of the bearing assembly has a second shoulder extending radially outwardly therefrom, wherein in the latched position, at least a portion of the first shoulder circumferentially and radially directly overlaps with at least a portion of the second shoulder to create the direct interlocking interface, wherein in the unlatched position, there is no direct circumferential or radial overlap between the first and second shoulders, and wherein at least one of the first or second shoulder is configured to impose a downward force when the bearing assembly is rotated into a latched position with the bowl.

9. The rotating control device of claim 8 wherein the rotary guide comprises two keys circumferentially separated by a gap, and the gap is sized to slidingly receive the second shoulder axially therethrough, wherein when the second shoulder is received in the gap, at least a portion of one of the two keys radially overlaps with at least a portion of the second shoulder.

10. The rotating control device of claim 1 comprising a security mechanism for restricting rotational movement of the bearing assembly relative to the bowl when the rotating control device is in the latched position.

11. The rotating control device of claim 1, wherein the bearing assembly further comprises:

a housing having an inner surface;

a spindle having a first end and a second end, at least a portion of the spindle being rotatably coupled to the inner surface of the housing;

a sealing element having an outer surface, the sealing element being threadedly connected to the second end of the spindle; and a retention assembly for restricting rotational movement of the sealing element relative to the spindle.

12. The rotating control device of claim 11, wherein the retention assembly comprises a key and a retaining pin, and wherein the sealing element has an outer surface having defined therein a slot and a recess circumferentially aligned with the slot, the recess configured to receive one end of the key while at least a portion of the key is received in the slot and the retaining pin configured to maintain the key in the slot.

13. The rotating control device of claim 12, wherein the second end of the spindle has one or more retention shoulders for abutting against the key when the sealing element is rotated relative to the spindle by a predetermined amount.

14. The rotating control device of claim 12, wherein the sealing element comprises:

a carcass having a central opening and a plurality of fingers; and an annular seal attached to the carcass such that the fingers extend axially inside the seal.

15. The rotating control device of claim 14, wherein the fingers are circumferentially arranged about the central opening of the carcass.

16. The rotating control device of claim 14, wherein the fingers extend axially along about 20% to about 95% of the length of the seal.

17. The rotating control device of claim 11, wherein the sealing element has a plurality of leaps extending radially outwardly from the outer surface of the sealing element, the plurality of leaps configured to slidingly and sealingly engage the inner surface of the housing.

18. The rotating control device of claim 11, wherein the sealing element comprises:

a carcass; and an annular seal attached to the carcass, the annular seal having an outer surface and a plurality of leaps extending radially outwardly from the outer surface.

* * * * *